(12) United States Patent
Malmgren et al.

(10) Patent No.: US 9,509,617 B1
(45) Date of Patent: Nov. 29, 2016

(54) AUTO LOAD TRANSFER IN GEOGRAPHICALLY DISTRIBUTED SYSTEMS

(71) Applicant: GRUBHUB HOLDINGS INC., Chicago, IL (US)

(72) Inventors: Clark Malmgren, Geneva, IL (US); Matthew Maloney, Chicago, IL (US)

(73) Assignee: GrubHub Holdings Inc., Chicago, IL (US)

( * ) Notice: Subject to any disclaimer, the term of this patent is extended or adjusted under 35 U.S.C. 154(b) by 0 days.

(21) Appl. No.: 15/019,860

(22) Filed: Feb. 9, 2016

(51) Int. Cl.
G06F 15/16 (2006.01)
H04L 12/803 (2013.01)
H04L 29/08 (2006.01)
H04L 12/26 (2006.01)
H04L 12/721 (2013.01)

(52) U.S. Cl.
CPC ......... *H04L 47/125* (2013.01); *H04L 43/0882* (2013.01); *H04L 45/70* (2013.01); *H04L 67/10* (2013.01)

(58) Field of Classification Search
CPC .......... H04L 5/0069; G06F 17/30241; G06F 2212/312; H04N 21/25841; H04N 21/4524
USPC ....................................................... 709/223
See application file for complete search history.

(56) References Cited

U.S. PATENT DOCUMENTS

| | | | | |
|---|---|---|---|---|
| 5,426,761 A * | 6/1995 | Cord | ................... | G06F 12/0862 711/114 |
| 5,428,796 A * | 6/1995 | Iskiyan | .................. | G06F 3/0601 710/240 |
| 5,694,570 A * | 12/1997 | Beardsley | ............. | G06F 3/0601 711/113 |
| 5,815,656 A * | 9/1998 | Candelaria | .......... | G06F 11/0727 714/48 |
| 5,991,775 A * | 11/1999 | Beardsley | ........... | G06F 12/0866 707/999.205 |
| 6,587,935 B2 * | 7/2003 | Ofek | .................... | G06F 11/2069 711/162 |
| 2003/0200478 A1 * | 10/2003 | Anderson | ........... | G06F 11/1076 714/6.31 |
| 2004/0103261 A1 * | 5/2004 | Honda | ................... | G06F 3/0605 711/202 |
| 2005/0246393 A1 * | 11/2005 | Coates | .................. | G06F 3/0607 |
| 2006/0083230 A1 * | 4/2006 | Ol | ...................... | H04L 12/40071 370/389 |
| 2006/0195676 A1 * | 8/2006 | Honda | .................. | G06F 3/0605 711/202 |
| 2006/0212747 A1 * | 9/2006 | Okamoto | ............ | G06F 11/1092 714/6.12 |

\* cited by examiner

*Primary Examiner* — Arvin Eskandarnia
(74) *Attorney, Agent, or Firm* — Hickman Palermo Becker Bingham LLP

(57) ABSTRACT

In an approach, load balancing is performed in a distributed system of nodes representing computational resources such as clients, servers, server clusters, virtual machines, and so forth. Each node within the distributed system is responsible for processing requests associated with one or more districts in a geographical area. In order to perform load balancing each node is programmed or configured to autonomously perform a set of actions on a periodic basis which includes checking neighbors for updates, determining whether to spawning a new node, determining whether to terminate, and balancing load with neighbors. As a result, the number of nodes and the districts for which each node is responsible dynamically changes over time to minimize the load placed on each node and to constrain the number of nodes that need to be active within the distributed system to reduce resource costs.

24 Claims, 10 Drawing Sheets

AUTO LOAD TRANSFER IN GEOGRAPHICALLY DISTRIBUTED SYSTEMS

FIELD OF THE DISCLOSURE

The present disclosure relates to computer-based systems that are programmed to perform automatic load balancing among distributed computers, or distributed computing nodes such as cloud computing instances or virtual machines. More specifically, the present disclosure relates to using an algorithm that is programmed and executed independently at each of a plurality of computing nodes in a distributed computer system to perform automatic load balancing without the need for a centralized master node.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Load balancing is a sub-field of distributed computer systems technology which focuses on techniques for distributing workload across multiple computing resources, such as computers, server clusters, network links, central processing units (CPUs), disk drives, virtual machine instances or cloud computing instances, and so forth. Load balancing, as the name suggests, aims to balance resource use in order to prevent any one resource from being overloaded. The consequences of a resource being overloaded may include delayed responses, requests being dropped, or in some cases even cause the underlying resource to crash or otherwise fail.

To implement load balancing, distributed systems can assign a "master" node which keeps track of the relative load of each computing resource and directs assignments of requests to resources. The master node may perform the assignment through any number of techniques, such as round-robin, random selection, weighted round robin, least workload, and other scheduling algorithms. One advantage to employing a distributed system to handle requests from clients is increased availability. Since there are multiple computing resources available to handle requests, the loss of any one resource is typically not critical since the remaining resources can redistribute the workload. However, in the case where there is a single "master" node that controls the scheduling, a single point of failure is introduced into the distributed system. Thus, if the master node fails, no new requests can be assigned to the remaining computational resources until the master node is brought back online.

Other techniques may make distributed systems more robust in the event of master node failure. For example, using a pair of master nodes (one active and one backup) to perform the assignments so that if one fails, another master node can assume responsibility for assigning requests. As another example, one of the non-master nodes (also referred to as slave or worker nodes) may be promoted to a master node and handle the assignment of requests to the remaining nodes. However, each of the aforementioned examples has drawbacks. Using a pair of master nodes, while being more robust than a single master node, still introduces a small number of nodes which are absolutely critical to the functioning of the distributed system. Thus, if those critical nodes fail, recovery may be significantly delayed. Furthermore, while promoting a worker node to a master node may work in theory, delays in messages carried by the underlying network may cause behavior such as two different worker nodes promoting themselves to a master node simultaneously. In such cases, the entire algorithm used to control the scheduling may break down or otherwise produce adverse effects.

SUMMARY OF THE DISCLOSURE

The appended claims may serve as a summary of the disclosure.

DETAILED DESCRIPTION

Figure 1:
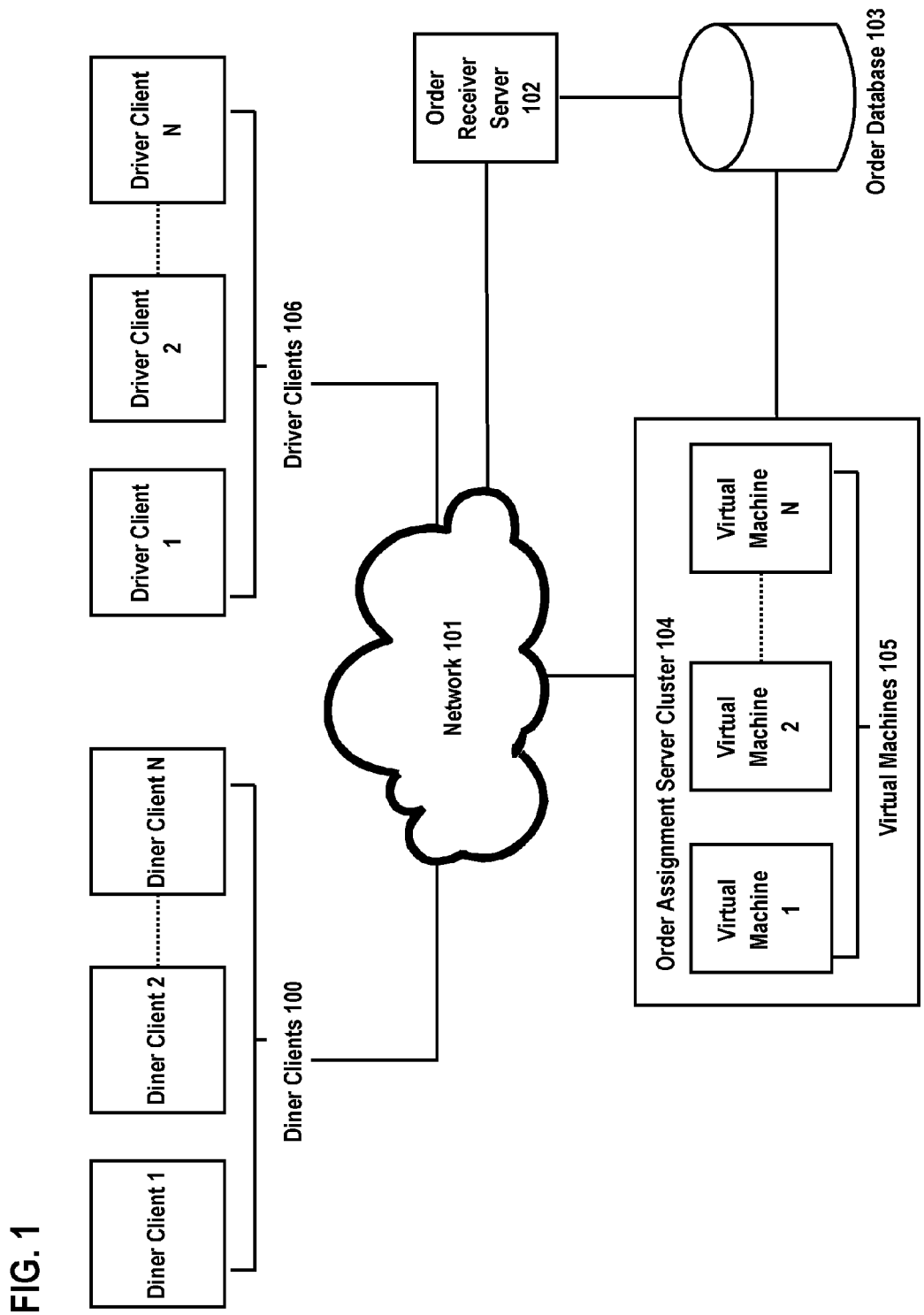
FIG. 1 illustrates an example operating environment upon which an embodiment may be implemented.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. The description is provided according to the following outline:

1.0 General Overview
2.0 Example Operating Environment
3.0 Example Load Balancing Algorithm
   3.1 Neighbor Detection
   3.2 Spawning
   3.3 Termination
   3.4 Balancing
4.0 Run-time Example
5.0 Alternative Embodiments
6.0 Alternative Use Cases
7.0 Extensions and Alternatives
8.0 Additional Disclosure
9.0 Hardware Overview

1.0 General Overview

Aspects of this disclosure provide technical solutions for performing load balancing in a distributed computer system in which computing nodes are programmed to balance load using peer-to-peer notification messages and local decisions to change processing responsibility, and without use of a centralized controller or master node.

In an embodiment, a distributed system includes a plurality of computing nodes representing computational resources such as servers, server clusters, virtual machine instances, CPUs, network links, disk drives, and so forth. The exact computational resources that the nodes represent is not critical and will vary from implementation to implementation. The nodes are configured to receive requests from one or more clients. The exact form of the request depends on the nature of the nodes in the distributed system. For example, if the nodes represent web servers, the requests may represent Hypertext Transfer Protocol (HTTP) requests. As another example, if the nodes represent hard drives, the requests may represent requests for retrieving data from or storing data in one or more memory locations.

A running example in this disclosure involves the case where the nodes represent virtual machines which provide a service that receives orders for made-to-order food delivery and assigns those orders to client computers termed driver clients that are associated with various delivery drivers who use motor vehicles or other transportation to deliver food from restaurants or other sources to customers. Thus, in the running example, the requests take the form of an order which may identify a delivery time for the order, a name/address/phone number of the customer who placed the order, a name/address/phone number of the restaurant that will be preparing food for the order, the food items being ordered, payment amounts, and so forth. Each virtual machine instance within the distributed system is assigned a portion of the geographic area from which orders may be received.

In some embodiments, the geographic area is divided into a grid, and each server is responsible for a subset of the grid. Each location or element of the grid is termed a "district". However, the term "district" is not limited to a grid representation and may more generally refer to discrete portions of the geographic area regardless of shape, size, or location. For example, the geographic area could comprise a country such as the United States represented using map data or other boundary data in computer memory based upon regions representing states or counties without use of a grid. At any given point in time, each district on the grid represents a specific amount of load that is proportional to the number of orders which are received from that location. For example, the load may be based on a rate at which orders are received over time, a pending number of orders awaiting assignment from the district, and so forth. Thus, in the problem domain of the running example, load balancing is performed by adjusting which districts on the grid are assigned to which nodes. The grid system is used as a representative example, but other representations may also be used such as latitude and longitude coordinates to denote the geographical boundaries for which each node is responsible.

The problem domain of performing load balancing across virtual machine instances to assign food orders is only one of many different types of problem domains to which the techniques described herein may be applied. For example, the techniques described in this disclosure may be applied to performing load balancing of memory requests across hard drives or storage clusters, performing load balancing across a plurality of web servers, performing load balancing for search queries across a set of servers, and so forth. Thus, the running example provided herein is only intended to illustrate one of numerous potential problem domains to which the techniques described herein may be applied.

In an embodiment, rather than assigning a master node to control the assignment of requests to nodes within the distributed system, each node is configured with a set of actions which are triggered on a periodic basis. The set of actions, when performed by each node independently, causes an optimal solution to the load balancing problem to emerge. The use of the term "optimal" is not intended to denote an absolute global optimum for the load balancing problem. In many cases, an approximation of the optimal solution is sufficient in a practical environment. In an embodiment, the actions that each node performs includes neighbor detection, spawning, termination, and balancing. The node performing the actions is referred to as the "current node" and the nodes which are responsible for districts abutting the boundary of the districts belonging to the current node are referred to as "neighboring nodes".

Neighbor detection identifies the nodes which are neighbors of the current node. In an embodiment, the current node periodically checks to make sure that all neighbors (nodes which share a boundary with the current node) are known. If not, the current node discovers the neighbor by routing a message using presently known neighbors. In addition, the current node sends a request to all known neighbors asking to be updated with the districts for which those neighbors are responsible. Once received, the current node updates a data structure that keeps track of the knowledge that the current node has about the respective territories of its neighbors. If the update shows that a known neighbor no longer shares a border with the current node, the current node drops that node from the data structure and no longer considers it to be a neighbor. If a neighbor does not respond to the update request for a threshold period of time, the neighbor is considered to have failed and the current node assumes responsibility for the districts known to belong to the failed node.

Spawning identifies when the current node is overloaded (when the load of the current node exceeds an upper-bound) and spawns a new node in response. During spawning, the current node notifies all neighbors of the intention to spawn. After sending the notification, the current node waits a threshold amount of time to allow other nodes to send balancing and/or spawn requests. Should the load fall below the upper-bound during the waiting period, the spawning action is aborted. In some embodiments, a node will also spawn should it discover that it no longer has any neighbors to ensure that the system always has at least two nodes active. Should a neighboring node send a spawn request during the waiting period, the current node enters into conflict resolution with that neighbor.

During conflict resolution both the current node and the neighboring node cancel their spawn requests and wait a random period of time before retrying. In some embodiments, the random wait is set at a minimum to be longer than the threshold amount of time that a node waits to follow through with the spawning request so that at least one of the nodes might eventually spawn. If the threshold amount of time is exceeded, the current node spawns a new node. The current node then assigns a portion of its load to the newly spawned node. For example, the current node may split the districts it is responsible for in half or may perform the split by assigning districts which result in relatively equal load between the current node and the newly spawned node. The current node also informs the spawned node of all of its neighbors.

Termination identifies when the current node is underloaded (when the load of the current node falls below a lower bound value) and shuts down. During termination, the current node notifies all neighbors of the intention to terminate. After sending the notification, the current node waits a threshold amount of time to allow the other nodes to send balancing and/or termination requests. In some embodiments, a node may only start the termination sequence if it has two or more known neighbors. This ensures that the system shall always have at least two nodes available without the need for any central monitoring. Should the load of the current node rise above the lower-bound due to a balancing request, the termination action is aborted. Should another neighboring node send a termination request, the current node and the neighboring node enter into conflict resolution.

During conflict resolution both the current node and the neighboring node cancel their termination requests and wait a random period of time before retrying. In some embodiments, the random wait is set at a minimum to be longer than the threshold amount of time that a node waits to follow through with the termination request so that at least one node might eventually terminate. If the threshold amount of time is exceeded, the current node terminates and gives away its districts to the neighboring nodes. For example, the current node may split its districts evenly among the neighbors based on number of locations or divide the districts among the neighbors such that each receives districts representing relatively equal load.

Balancing is performed on a periodic basis and involves trading responsibility for districts between the current node and the neighboring nodes to optimally spread the load. There are a multitude of approaches for determining which districts to transfer, such as a specific algorithm, genetic algorithm, optimization solver, and so forth. In an embodiment, the balancing takes into account factors such as favoring roundness over gerrymandering (long snake-like regions), penalties for running a boundary through a dense area (area with a high-density of load), equalizing load between neighboring nodes, and maintaining contiguous regions of responsibility for each node. In some embodiments, one or more of the aforementioned factors represent hard constraints. For example, some embodiments may prevent non-continuous regions from being assigned to a single node in order to lower the complexity of determining neighboring nodes.

In some embodiments, node balancing is performed using a genetic algorithm. A genetic algorithm is an iterative search algorithm that mimics the process of natural selection. The components of a genetic algorithm include a representation of the problem domain and a fitness function to evaluate the solution domain. A genetic algorithm begins with an initial pool of one or more candidate solutions. During each iteration of the algorithm, each solution is evaluated using the fitness function with some portion of the candidate solutions being discarded and the remainder being selected to carry over to the next round. After selection, genetic operators are applied to the candidate solutions (such as mutation and/or crossover) to generate additional candidate solutions. During mutation, candidate solutions are slightly modified (e.g. typically at random) to produce a new candidate solution. During cross-over, two or more candidate solutions are combined to form a new candidate solution.

The general concept of a genetic algorithm is that solutions which are more "fit" continue to survive to produce the next generation of candidate solutions. Over time the pool of candidate solutions evolve to optimize the criteria found in the fitness function. Thus, genetic algorithms have the convenient property that one need only specify the "goal" or "end result" to be accomplished without the need to specify the exact steps needed to reach that goal.

The aforementioned genetic operators mimic biological reproduction which in nature typically involves the combination of the genetic code of two organisms with some additional random mutation. However, not all genetic algorithms use both types of genetic operators. For example, crossover may be difficult to represent efficiently in some problem domains and instead new solutions may be produced exclusively through mutation, which in effect mimics asexual reproduction.

For the problem domain of the running example, the representation of the problem domain represented as a grid of districts and each solution in the solution domain is an assignment of the districts to the various nodes of the distributed system. The fitness function is a measurement of how well the solution performs load balancing and may be based the factors described above with respect to the balancing action. However, the exact factors used in the fitness function depends on the context of the problem being solved and may vary greatly from implementation to implementation.

The pool of candidate solutions is represented by the current assignment of districts between the nodes. The genetic operator applied is a mutation which causes random districts to swap assignments between neighboring nodes. Thus, in operation each execution of the balancing action represents an iteration of the genetic algorithm, during which the current best solution is modified through mutation to generate a new pool of candidate solutions. Each of the new candidate solutions is then evaluated using the fitness function, with the most fit candidate carrying on to the next round. As the algorithm progresses, the assignment of districts to nodes evolves to optimize the fitness function and thus provides an optimal solution to the load balancing problem.

One advantage to applying a genetic algorithm to the problem of load balancing is that the genetic algorithms are highly adaptable to changing circumstances. As load changes across the districts, the assignments to the nodes of the distributed system will shift to re-optimize as measured by the fitness function and therefore will converge on a new optimal solution to the load balancing that takes into account the changed circumstances.

As a whole, neighbor detection ensures that each node has up to date information regarding its neighbors and the districts for which those neighbors are responsible. The termination and spawning actions ensures that an appropriate number of nodes are kept online to handle the total amount of load across the districts. The balancing action ensures that the load is as evenly spread as possible among the nodes that presently exist in the distributed system. Thus, no centralized "master" node is required and the load balancing results from each node autonomously performing the periodic actions.

Other features and aspect of the disclosure will become apparent in the drawings, description, and claims.

2.0 Example Operating Environment

FIG. 1 illustrates a computer networking environment with which an embodiment may be implemented. In FIG. 1, one or more diner clients 100, one or more driver clients 106, order receiver server 102, and order assignment server cluster 104 are communicatively coupled over network 101. In one embodiment, the diner clients, driver clients, order receiver server and order assignment server cluster all comprise computers; mobile computing devices may be used in some cases. The one or more diner clients 100 submit orders for food delivery to order receiver server 102, which stores the orders within order database 103. The orders stored in the order database 103 are then assigned by virtual machines 105 of the order assignment server cluster 104 to the driver clients 106, each of which is associated with a particular delivery driver that can be utilized to deliver the made-to-order food.

In some embodiments, the operating environment of FIG. 1 also includes one or more restaurant servers which inform the restaurant(s) that will be preparing the food of the order and one or more restaurant clients through which the notifications sent by the restaurant servers are received. However, the restaurant servers and clients are not specifically relevant to the running example and have been left out to avoid unnecessarily obscuring the figure. Although a particular number of elements have been depicted in FIG. 1, a practical environment may contain virtually any number of the elements depicted in FIG. 1. For example, a practical environment may have virtually any number of diner clients 100, driver clients 106, virtual machines 105, and so forth.

Furthermore, the elements depicted in FIG. 1 may be communicatively coupled in a manner that differs from FIG. 1. For example, in FIG. 1 the order assignment server cluster 104 and order receiver server 102 are depicted as connected to order database 103 without an intervening network. However, in other embodiments the order database 103 may be communicatively coupled to the order receiver server 102 and the order assignment server cluster 104 through network 101 or any other combination of networks. Thus, the actual manner in which the elements of FIG. 1 are communicatively coupled is not critical and may be implemented using virtually any technique.

In FIG. 1, the diner clients 100 and driver clients 106 each may represent desktop computers, laptops, mobile devices such as tablet computers or smartphones, software executing on the aforementioned devices, virtual machines, and so forth. In an embodiment, diner clients 100 include software and/or hardware components which allow users of the diner clients 100 to browse menu lists for various restaurants, select made-to-order food items to purchase, set delivery addresses, make payments, contact customer service representatives, and so forth. When an order is made through the diner clients 100, the diner clients 100 send a message that contains the details of the order through network 101 to the order receiver server 102. The content of the message may vary between embodiments, but examples include the food items to be delivered, the address of the diner, a delivery time, an identifier for the restaurant that will prepare the food, address of the restaurant, special delivery or food preparation instructions, tip amounts, and so forth.

In some embodiments, one or more of the aforementioned fields of information are supplied via a user interface displayed by the diner clients 100. For example, the diner clients 100 may represent web browsers executing on respective computing devices and the menu may be displayed as a result of receiving a web page sent by a web server that provides a service for accessing restaurant menus and placing orders. In some embodiments, one or more of the aforementioned fields may be supplied automatically. For example, the address of the diner may be supplied by consulting a Global Positioning System (GPS) device that is accessible to or built into the devices executing the diner clients 100.

The order receiver server 102 represents one or more computing devices, such as servers, server clusters, virtual machines, and so forth. In an embodiment, the order receiver server 102 receives the messages sent by the diner clients 100 and stores the details of the orders in the order database 103. For example, if the order database 103 represents an SQL database, the order receiver server 102 may represent an SQL server that processes the message sent by the diner clients 100 and converts the information contained in the message into the format expected by the order database 103, such as relational format, object format, object-relational format, flat file format, and so forth.

In other embodiments, the order database 103 may be controlled by a separate database server (not depicted) and the order receiver server 102 may represent a client of that database server. In some embodiments, the order receiver server 102 represents a web server that is configured to receive Hypertext Transfer Protocol (HTTP) requests from the diner clients 100 and perform actions such as supplying websites with information regarding restaurant menus, taking orders for food to be delivered from the aforementioned restaurants, contacting third party financial systems to verify payments, and so forth.

In an embodiment, order database 103 represents one or more storage devices, such as hard drive disks, cloud storage, data warehouses, RAID disk arrays, and so forth. The data stored within the order database 103 may be stored in virtually any data format, such as relational, object, object-relational, flat file, and so forth. In some embodiments, the data stored in each record of the order database 103 mirrors the different fields or types of information sent in a message from the diner clients 100 to the order receiver server 102. However, in some embodiments, the data includes at least a geographic location of the diner and/or a geographic location of the restaurant. For example, some of the techniques described later rely on the ability to pinpoint the location of requests which place load on the virtual machines 105 of the order assignment server cluster 104. Thus, in such embodiments, the district being served is one of the factors that determines which virtual machine will service the request. However, in some embodiments, the order database 103 may include, rather than a street or other geographical address, information that could be used to logically infer the address, such as an Internet Protocol (IP) address of the diner client which placed the order.

In some embodiments, the order database 103 or a database server which provides access to the order database 103 is configured to accept queries and process the queries to return relevant order records. For example, a query may be received for all orders which pertain to a particular geographic region and the order database 103 or database server would return all order records pertaining to that geographic region in response. However, the order database 103 may also be configured to accept queries based on virtually any field of the order and is not limited to geographical queries.

Furthermore, for embodiments which divide up geographical regions into districts on a grid, the database server may be configured to accept the indexes identifying a district or group of districts and return all requests from the queried district(s). In some embodiments, the order database 103 may maintain or be represented as a queue or priority queue where orders are ranked based on urgency. The ranking can be performed based on many factors, such as time the order was received, whether the order has been earmarked for expedited delivery, whether a specific delivery time has been set of the order, and so forth.

The order assignment server cluster 104 represents one or more servers, server clusters, data centers, and so forth that are configured to execute virtual machines 105 which retrieve order records from the order database 103 and assigns those orders to the driver clients 106. In some embodiments, the order assignment server cluster 104 is maintained by a third party service provider that allows virtual machines 105 to be spun up on demand in order to execute software which performs the assignments. In the embodiment depicted in FIG. 1, the elements within the order assignment server cluster 104 are virtual machines 105. However, in other embodiments the virtual machines 105 may be replaced with physical servers or a combination of both physical servers and virtual machines 105. For example, a made-to-order food delivery service may utilize a small set of physical servers that are always available to handle a baseline of requests and may utilize a third party service to spin up virtual machines 105 as additional resources when the load on the physical servers exceeds a predetermined threshold.

However, in the case of using a third party service to manage the virtual machines 105, there is typically a cost associated with maintaining currently executing virtual machines 105 and/or spinning up new virtual machine instances. Thus, in some embodiments, the load balancing techniques described herein minimize the number of virtual machines 105 that need to be executing concurrently to maintain a reasonable load at each of the virtual machines 105.

In some embodiments, the virtual machines 105 may be replaced with or executed using physical servers or server clusters that are geographically dispersed to minimize latency with the driver clients 106. However, in some cases, the latency may represent only a small portion of the time required to get assignments to the driver clients 106. For example, the time required to compute which driver clients 106 to consider for an order assignment may constitute the vast majority of the total time spent performing the assignment. Thus, in other embodiments, the physical servers may be grouped in relatively few locations or even a single location since latency would not be a significant concern compared to speeding up the assignment decisions by spreading the processing across the virtual machines 105.

Although the operating environment of FIG. 1 depicts elements such as virtual machines 105, the load balancing techniques described herein may be used for virtually any computing resource within a distributed system. Thus, anywhere an example is presented using a "virtual machine", the "virtual machine" may be replaced with hard drives, servers, computing clusters, and so forth depending on the load balancing problem at hand. The generalized term for a computing resource is a "node" of which a virtual machine is only one specific example. Thus, although the operating environment of FIG. 1 has been described in relation to a more specific computing resource, the load balancing algorithm described in Section 3.0 is instead described generally in terms of "nodes".

In an embodiment, each of the virtual machines 105 within the order assignment server cluster 104 are responsible for a particular geographical area. For example, if the made-to-order food service is being run for the United States, Virtual Machine 1 may be responsible for the east coast, Virtual Machine 2 may be responsible for the west coast, Virtual Machine 3 may be responsible for the southwest, and so forth. The manner in which the geographical areas are defined is not critical. For example, each geographical area may be defined based on sets of latitude and longitude coordinates which define the borders of the geographical area.

As another example, the total geographical area may be broken down into a grid system, with each of the virtual machines 105 being responsible for a subset of the districts within the grid. A district may be defined using [x,y] coordinates corresponding to the horizontal and vertical index of the district. Thus, the region of responsibility for each virtual machine may be defined as a collection of [x,y] coordinates defining the metes and bounds of the districts that the virtual machine is responsible for serving. In order to provide clear explanations, many of the examples presented herein assume that the grid representation is being used, but explanations regarding the alternative formats are also provided below in Section 4.0.

While executing, each virtual machine periodically queries the order database 103 for orders that fall within the districts under the control of the virtual machine and then assigns those orders to the driver clients 106. In some embodiments, the virtual machines 105 are configured to prioritize some orders for assignments over others, such as by the existence of a priority ordering stored by the order database 103, order time, specified delivery time, special flag, and so forth. Furthermore, in some embodiments, the order database 103 may not return all orders which match the query, but instead may return the top N orders based on priority, leaving the remainder to be collected at a later time.

The exact technique used to assign orders to the driver clients 106 is not critical, but may be based on factors such as location of each of the driver clients 106 with respect to the restaurant fulfilling the order and/or the diner receiving the order, number of orders currently assigned to the driver client, the route that the driver client will need to take to fulfill currently assigned orders, weather conditions, traffic patterns, and so forth.

In an embodiment, each of the virtual machines 105 executes actions related to balancing the load assigned to each virtual machine, determining when a new virtual machine should be spawned, determining when an existing virtual machine should be terminated, and sending update requests to neighboring virtual machines. The aforementioned steps strive to keep the load between the virtual machines 105 as balanced as possible while using the fewest number of virtual machines 105 required to keep the load of each virtual machine within a reasonable tolerance. Keeping the load balanced between virtual machines 105 reduces the risk of any given virtual machine will become overloaded and drop or delay order assignments. In addition, using the fewest number of virtual machines 105 necessary to achieve reasonable performance drives down resource cost. The details of the aforementioned actions are described in detail below in Section 3.0.

In an embodiment, when a virtual machine determines to assign an order to a particular driver client, the virtual machine sends a message to the driver client that includes the details of the order. For example, the message may indicate an address of the restaurant preparing the food where a driver associated with the driver client can pick up the order, an address of the diner where the driver will deliver the order, a priority of the order, a potential route to take to reach the restaurant and/or diner, and so forth. In some embodiments, the driver client, in response to being assigned the order, displays a user interface to the driver displaying the details of the order and/or a map displaying an optimal route to reach the restaurant and/or the diner.

In some embodiments, the virtual machine determines a set of optimal driver clients and sends a message to each one informing the associated driver that they are eligible to deliver the order. The virtual machine then collect confirmations from the set of drivers and determines which one will receive the assignment based on location of each of the driver clients 106 with respect to the restaurant fulfilling the order and/or the diner receiving the order, number of orders currently assigned to the driver client, the route that the driver client will need to take to fulfill currently assigned orders, weather conditions, traffic patterns, and/or other factors.

In an embodiment, the driver clients 106, represent desktop computers, laptops, mobile devices, software executing on the aforementioned devices, virtual machines, and so forth. In an embodiment, driver clients 106 include software and/or hardware components which allow users of the driver clients 106 to receive orders for delivery and/or submit bids to be assigned an order for delivery. In some embodiments, the driver clients 106 display a user interface through which a delivery driver can view currently assigned orders, routes to take to reach restaurants and/or diners of current deliveries, view orders which the driver is eligible to be assigned, place bids on orders and so forth.

3.0 Example Load Balancing Algorithm

In an embodiment, each node in a distributed system is configured with a set of actions which are each triggered on a periodic basis. For example, in relation to the example operating environment of FIG. 1, the nodes correspond to the virtual machines 105 which retrieve requests for orders sent by the diner clients 100 and assigns those orders to the driver clients 106. The set of actions, when performed by each node autonomously over a length of time, causes the optimal solution to the load balancing problem to emerge. In an embodiment, the actions that each node performs includes neighbor detection, spawning, termination, and balancing. The node performing the actions is referred to as the "current node". Furthermore, the following explanation assumes that the workload is divided by geographic districts. Thus, a "neighbor" to the current node is a node which is assigned responsibility for districts which borders the districts for which the current node is responsible.

In other embodiments and/or problem domains, the definition of a neighbor may change. For example, if the nodes represent hard drive disks each node may be responsible for performing requests directed towards different categories of data, where the categories could be logically defined to have "neighboring" categories. As another example, search solutions often place items into spatial regions based on real geography or by mapping concepts onto an N-dimensional space which is indexed by a set of coordinates. The manner in which a neighbor is defined is specific to the exact problem being solved by the distributed system and may vary significantly from embodiment to embodiment. Terms which rely on geographic locations, such as "geographic regions", "territory", "area", "districts", and so forth may in other embodiments refer generally to the division of the problem domain into specific areas of responsibly, rather than necessarily being limited to "real" geographic locations.

Neighbor detection identifies the nodes which are direct neighbors of the current node. In an embodiment, the current node periodically checks to make sure that all neighbors (nodes which share a border with the current node) are known. If not, the current node discovers the neighbor by routing a message using known neighbors. In addition, if a known neighbor no longer shares a border with the current node, the current node ceases to consider that node to be a neighbor. Furthermore, during neighbor detection, the current node verifies that all known neighbors are still active, for example by sending a request to each neighbor in turn. If the request if not answered within a threshold amount of time, the neighbor is considered dead and the current node assumes responsibility for the territory of the failed neighbor.

Spawning identifies when the current node is overloaded (e.g. when the load of the current node exceeds an upper-bound) and spawns a new node in response. During spawning, the current node notifies all neighbors of the intention to spawn. After sending the notification, the current node waits a threshold amount of time to allow other nodes to send balancing and/or spawn requests. Should the result of the balancing requests cause the load of the current node to fall below the upper bound value, spawning is aborted. In some embodiments, a node will also spawn should it discover that it no longer has any neighbors to ensure that the system always has at least two nodes active. Should a neighboring node send a spawn request during the waiting period, the current node enters into conflict resolution. During conflict resolution both the current node and the neighboring node cancel their spawn requests and wait a random period of time before retrying.

In some embodiments, the random wait is set at a minimum to be longer than the threshold amount of time that a node waits to follow through with the spawning request so that at least one node might eventually spawn. If the threshold amount of time is exceeded without any intervening spawning requests or balancing requests that cause the load to drop below the upper bound value, the current node creates a new node. The current node then assigns a portion of its load to the newly spawned node. For example, the current node may split its districts in half or may perform the split by assigning districts which represent relatively equal load. The current node also informs the spawned node of all of its neighbors.

Termination identifies when the current node is underloaded (e.g. when the load of the current node exceeds a lower bound value) and shuts down. During termination, the current node notifies all neighbors of the intention to terminate. After sending the notification, the current node waits a threshold amount of time to allow the other nodes to send balancing and/or termination requests. Should the load of the current node rise above the lower-bound due to a balancing request, the termination is aborted. Should another neighboring node send termination request, the current node and the neighboring node enter into conflict resolution. In some embodiments, a node may only start the termination sequence if it has two or more known neighbors. This ensures that the system shall always have at least two nodes available without the need for any central monitoring.

During conflict resolution both the current node and the neighboring node cancel their termination requests and wait a random period of time before retrying. In some embodiments, the random wait is set at a minimum to be longer than the threshold amount of time that a node waits to follow through with the termination request so that at least one node might eventually terminate. If the threshold amount of time is exceeded without any intervening termination requests or balancing requests that cause the load to rise above the lower bound value, the current node terminates and gives away its districts to the neighboring nodes. For example, the current node may split its districts evenly among the neighbors based on number of districts or the load represented by the districts.

Balancing is performed on a periodic basis and involves trading responsibility for districts with neighbors of the current node to optimally spread the load. There are a multitude of options for determining which regions to trade, such as a specific algorithm, genetic algorithm, optimization solver, and so forth. The examples presented in this section relate to the genetic algorithm embodiment, but the techniques described herein can be applied to virtually any balancing scheme. In an embodiment, the balancing takes into account factors such as favoring roundness over gerrymandering (long snake-like regions), penalties for running a boundary through a dense area, equalizing load between neighboring nodes, and maintaining contiguous regions.

In some embodiments, one or more of the aforementioned factors represent hard constraints. For example, some embodiments may prevent non-continuous regions from being assigned to a single node in order to lower the complexity of determining neighboring nodes. Hard constraints can be implemented in a variety of ways. In one example, the fitness function used by the genetic algorithm could be configured to return the lowest possible score when evaluated on a solution which would violate any of the hard constraints. In another example, genetic operator(s) could be designed to only produce solutions which adhere to the hard constraints.

The initial state of assignments between geographic regions and nodes may be set in a variety of ways. In some embodiments, one node is initially started up and assigned responsibility for all geographic regions. Since this would place all the load on a single node, that node is highly likely to quickly spawn new nodes to take over a share of the responsibility. Eventually, as the algorithm progresses, new nodes will continue to be spawned, balanced, and/or terminated until a steady state is reached which represents the optimal solution to the load balancing problem.

Alternatively, some embodiments may begin with a predetermined number of nodes which has been shown historically to be capable of handling at least a baseline of expected load. If the load was overestimated, nodes will begin to terminate until a steady state is reached. If the load was underestimated, nodes will be spawned until a steady state is reached. The territory initially assigned to the nodes may be based on evenly splitting the districts or by evenly splitting the estimated load. For example, historical measurements may be recorded at various districts during the day (e.g. based on 15 minute intervals, 30 minute intervals, hour intervals, and so forth) and the records may be used to create an estimate for each district of how much load that district is likely to represent. For example, in the context of assigning orders for made-to-order food delivery, the load may vary drastically throughout the day, such as peaking during lunch and dinner hours for a given district and tapering off most other times. Thus, the initial amount of nodes may be set so that, based on the average load of each location on the grid, a number of nodes is initially spawned that could in theory evenly distribute the estimated load.

However, in many cases, underestimating the number of nodes that will be required to handle the load and allowing the algorithm to spawn new nodes as needed may be preferable to potentially overestimating the load and starting up an excess of nodes. As mentioned above, each node often requires an expenditure of resources in order to be started up. For example, third party services often provide server farms where businesses can request additional virtual machines to be spun up in order to handle requests. However, there is often a fee associated with starting up a new virtual machine, even if that virtually machine runs only for a short period of time. Thus, underestimating the load may in some cases take longer to reach a steady state than estimating the number of nodes which might be needed, but may require less expenditure of resources.

In an embodiment, each of the aforementioned actions (neighbor detection, spawning, termination, and balancing) are executed individually by each node in the distributed system based on a respective timer. The exact value to which the timer is set for each action is set is not critical. In fact, the optimal setting for the timers is likely to be domain specific and may require empirical tests to determine. However, in some embodiments, the timer time for the balancing action is set to be significantly shorter than the timer for the spawn or termination action. As a result, the nodes have a chance to balance out the load before considering whether to spawn or terminate which are typically more expensive actions.

In an embodiment, each node maintains a data structure (e.g. a list, graph, matrix, and so forth) or collection of data structures that keeps track of the districts owned by the current node and each neighbor of the current node. The aforementioned data structure is updated during the neighbor detection action described above. In order to provide clear examples, the following explanation assumes that the data structure is a matrix, where the matrix is indexed using [x,y] coordinates and each element of the matrix stores an identifier of the node which is responsible for that district. However, the techniques described herein are not limited to cases where the data structure is implemented using a matrix. The aforementioned matrix is referred to as the "district matrix". In addition to the district matrix, each node also maintains metadata for each neighbor that specifies an address at which the neighbor may be contacted. Depending on the nature of the nodes, the address may be an IP address, port address, IP address/port address pair, fully-qualified domain name, process ID, or virtually any other form of address.

3.1 Neighbor Detection

Figure 2:
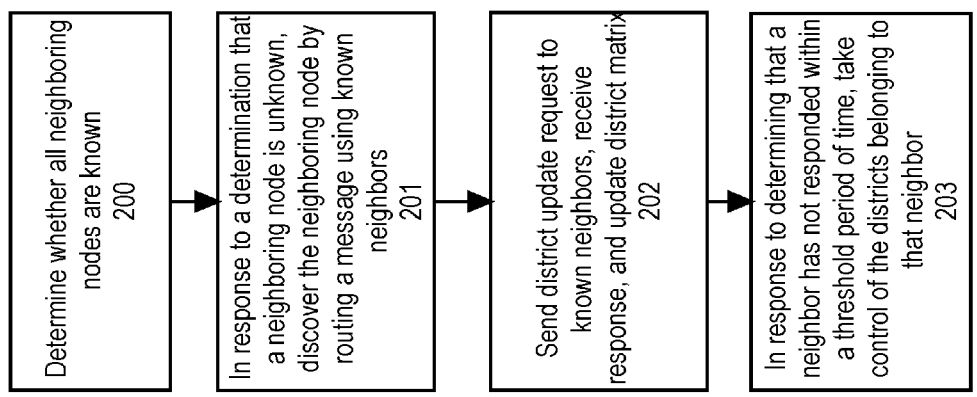
FIG. 2 illustrates a process for detecting neighbors in block diagram form according to an embodiment.

FIG. 2 illustrates a process for detecting neighbors in block diagram form according to an embodiment. In an embodiment, the process illustrated in FIG. 2 is represented by a set of computer program instructions or other executable logic which, when executed by the current node, causes the current node to perform the steps of FIG. 2. Although the steps depicted in FIG. 2 are presented in a particular order, other embodiments may combine steps, separate out steps, or reorder steps in comparison to blocks of FIG. 2. In an embodiment, the process illustrated in FIG. 2 is performed by the virtual machines 105 executing in the operating environment of FIG. 1. Various embodiments may be implemented using computers programmed according to the algorithm of FIG. 2, or special-purpose computers that operate according to the algorithm of FIG. 2. In an embodiment, FIG. 2 and each other flow diagram is intended to illustrate an algorithm that may be programmed, using any suitable programming environment or language, to create machine code capable of execution by a CPU or microcontroller of the computing nodes that are described herein, or computer system 600 of FIG. 6. In other words, FIG. 2 and each other flow diagram, together with the written description in this document, is a disclosure of an algorithm of aspects of the claimed subject matter at the same level of detail that is normally used for communication of this subject matter among skilled persons in the art to which the disclosure pertains. Various embodiments may be coded using assembly, C, Objective-C, C++, Java, JavaScript or other human-readable languages and then compiled, assembled, or otherwise transformed into machine code that can be loaded into ROM, EPROM, or other recordable memory of the activity monitoring apparatus that is coupled to a processor and then executed by the processor.

At block 200, the current node determines whether all neighboring nodes are known. Neighboring nodes may be unknown for a number of reasons, including having a lack of knowledge of neighbors upon initial spawning, as a result of neighbors terminating and giving districts to other nodes, spawning a new node which becomes bordered with the current node, district exchanges during the balancing step and so forth. In some embodiments, when the current node is initially spawned the district matrix initially stores a default value for each district, such as a NULL value, to indicate that the nodes responsible for the various districts are not yet known. As explained in more detail below in Section 3.2, the current node is then given a set of districts by the node which spawned it ("spawning node") and an address at which the spawning node can be reached.

Since the spawning node is giving the current node a portion of its own territory, the spawning node is known to be a neighbor of the current node. However, while the current node may have knowledge of the districts for which it is responsible and knowledge that the spawning node is a neighbor, the current node may not have knowledge of all its neighbors and the districts for which those neighbors are responsible. Thus, in an embodiment, if the district matrix does not specify an address for a neighboring node that has responsibility for a district on the other side of the border, the current node determines that the neighbor is unknown. For example, the current node may identify all border districts for which it is responsible and determine whether each district which shares a vertex with a border district has a valid address within the district matrix.

At block 201, in response to a determination that a neighboring node is unknown, the neighboring node is discovered by routing a message using known neighbors.

In an embodiment, the current node sends a message to the spawning node and requests to be updated with the addresses of its neighbors. Since the spawning node previously held the territory now belonging to the current node, the spawning node in its respective district matrix has knowledge of the nodes which held territory across the border that now forms the boundary of the districts for which the current node is responsible. The spawning node in response to receiving the request performs a lookup in its respective district matrix and returns the addresses of those neighbors to the current node. The current node then adds the received addresses to the metadata and uses the received addresses to send a message to each of the identified neighbors asking to be updated with the districts belonging to those neighbors. The neighboring nodes, upon receiving the aforementioned requests, returns the [x,y] coordinates of the districts for which each respective neighboring node is responsible. The current node then updates the district matrix which, as a result, identifies the working topography of the current node and the neighbors of the current node.

In some cases, due to changes in district ownership due to the balancing, spawning, and termination actions performed by other nodes, the district matrix may still contain border districts for which the owner is unknown. In some embodiments, to discover the owners of these unknown districts, the current node sends messages to its known neighbors identifying the border districts for which the owner is unknown and asking to be informed of the owner. A node receiving the aforementioned request performs a lookup into its own district matrix and if the owner of the district is known, returns the address at which the owner can be contacted. The current node can then contact the owner to request the districts for which the owner is responsible and update its own district matrix with the districts received from the owner. In some cases, due to exchanges of districts by other nodes, one or more of the neighbors identified by the spawning node may no longer be neighbors of the current node. As a result, in some embodiments, the current node prior to updating the district matrix checks that at least one district belonging to the purported neighbor actually shares a border with the districts belonging to the current node. If not, the purported neighbor is dropped (e.g. removes the address from metadata) and its districts are not added to the district matrix.

In some embodiments, rather than identifying neighboring nodes and the districts owned by the neighboring nodes by routing messages through the known neighbors, a persistent storage layer can be used instead. For example, a backing datastore such as Cassandra, commercially available from the Apache Software Foundation headquartered in Forest Hill, Md., could be used to create a virtual "official" representation of the ownership of each district in a distributed, yet consistent, manner. Since backing datastore such as Cassandra can use transactions to update the data, the risk of nodes relying on conflicting information is eliminated or significantly reduced. Thus, in such embodiments, the back-end datastore acts as a communal district matrix shared by each node. At block 202, the current node sends a request to its known neighbors to return the districts for which those neighbors are presently responsible. In an embodiment, as time progresses, the neighboring nodes perform balancing actions, spawning actions, termination actions, and so forth which cause shifts in the districts for which each neighbor is responsible. Thus, at block 202, the current node sends a request to be brought up to date with the districts for which each neighbor is responsible. For example, the neighbors may return the [x,y] coordinates of each district for which each respective neighbor is responsible. The current node then updates its district matrix.

In some cases, there may be a gap in the districts along the border of the territory belonging to the current node. For example, one of the neighbors may have traded those districts to another node or spawned a new node which assumed responsibility for those districts. In such cases, the current node sends a request to the node which previously had responsibility for those districts and requests an address of the node to which those districts are presently assigned. Upon receiving the address, the current node then sends a request to that node to be updated with the districts belonging to that node and updates the metadata to specify that the node is now a neighbor. In some cases, the updated districts for one of the known neighbors may indicate that the neighbor no longer shares any districts along the border of the current node. In such cases, the address of that neighbor is removed from the metadata. In some cases districts may have exchanged hands multiple times. Thus, requests may be sent recursively tracing the route of the nodes which previously held and exchanged the districts.

At block 202, the current node determines that a neighboring node has not responded to the request within a threshold amount of time and in response takes control of the districts belonging to the failed neighbor. In some embodiments, not responding to a request for districts serves as an indication that the neighboring node has crashed or otherwise has stopped responding. Thus, in response, the current node takes control of the districts that had been previously known to be the responsibility of the failed neighbor. For example, the current node may update the district matrix to indicate that those districts now belong to the current node and the current node will then begin also servicing client requests originating from those districts. In some corner cases there is a risk that two nodes may attempt to take responsibility for the districts belonging to a failed node at approximately the same time. However, this risk can be mitigated in some embodiments by using a lightweight transaction to ensure that only one node "wins" or by requiring a node to broadcast the intention to take over the districts belonging to a failed node with randomized retries determining who succeeds in the event of a conflict.

3.2 Spawning

Figure 3:
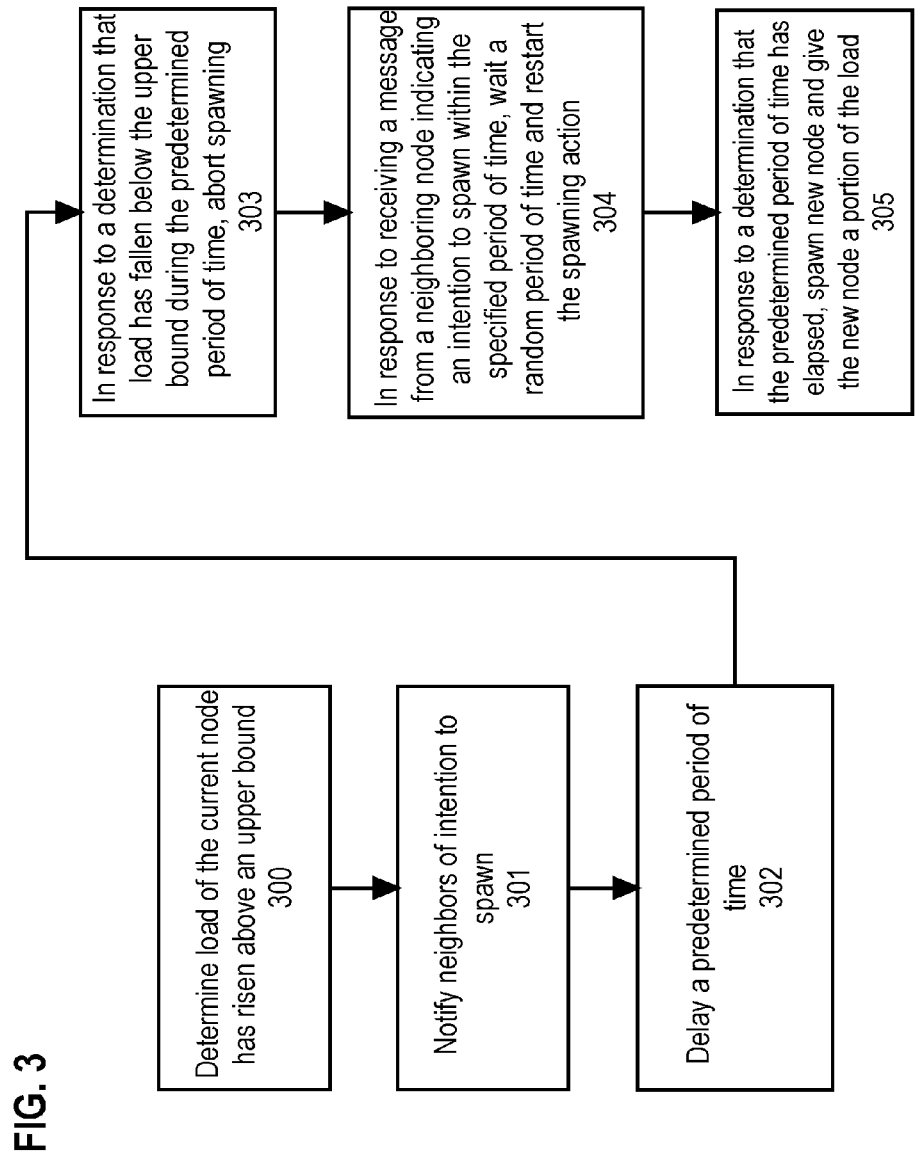
FIG. 3 illustrates a process for spawning a new node in block diagram form according to an embodiment.

FIG. 3 illustrates a process for determining when to spawn a new node in block diagram form according to an embodiment. In an embodiment, the process illustrated in FIG. 3 is represented by a set of program instructions which, when executed by the current node, causes the current node to perform the steps of FIG. 3. Although the steps depicted in FIG. 3 are presented in a particular order, other embodiments may combine steps, separate out steps, or reorder steps in comparison to FIG. 3. In an embodiment, the process illustrated in FIG. 3 is performed by the virtual machines 105 executing in the operating environment of FIG. 1.

At block 300, the current node determines that its load has risen above an upper threshold. In an embodiment, the current node maintains a predetermined upper bound value of load that is considered "acceptable" for the problem domain. For example, load may be determined based on a number or rate of requests that are received from clients that are within each district for which the current node is responsible, total population responsibility, and/or response latency. However, load may also be determined based on factors related to the node itself, such as present CPU usage, memory utilization, network utilization, and so forth. In addition, the load may be a weighted or non-weighted combination of the aforementioned factors. The exact threshold for the upper bound value is highly dependent on the problem domain and may vary between embodiments.

At block 301, the current node notifies neighboring nodes of its intention to spawn. In an embodiment, the current node consults its metadata for known neighbors and sends a message to each of the known neighbors identifying the intention to spawn.

At block 302, the current node delays a predetermined period of time. In an embodiment, the current node waits a predetermined amount of time in order to allow the load to drop back below the upper bound value before following through with the spawning and to give neighboring nodes a chance to send their own spawning requests. The former case hedges against having a significant amount of churn that may result if the spawning occurs immediately after the upper bound value is violated, even if violated only for a brief period of time, to prevent additional nodes from being started up prematurely. The latter case hedges against neighbors proceeding with spawning their own nodes concurrently, potentially resulting in an excess of nodes being created. For instance, it is possible that both nodes may be overloaded, but only one additional node is required between the two in order to balance the load. In both of the aforementioned cases, there is a risk of incurring additional resource cost by spinning up nodes which may not be necessary in the long run.

At block 303, in response to determining that the present load has fallen below the upper bound value during the predetermined period of time, the current node aborts spawning. While the current node is delaying for the predetermined period of time, the current node monitors the present load. If the present load drops below the upper bound value prior to the expiration of the predetermined period of time, the current node aborts the spawning process and aborts the spawning process illustrated in FIG. 3.

At block 304, in response to receiving a message from a neighboring node indicating an intention to spawn within the predetermined period of time, the current node waits a random period of time before restarting the spawning action. While the current node is delaying for the predetermined period of time, the current node continues to accept messages from neighboring nodes, such as balancing, spawning, neighbor detection, and/or termination requests. If the current node receives a spawning request from a neighboring node during the waiting period, the current node enters into conflict resolution with the node which sent the spawning request.

During conflict resolution, the current node waits a random period of time before restarting the spawning process by returning to block 300. In an embodiment, the range of time from which the current node selects the random period is set to be at least longer than the predetermined period of time required before spawning a new node. Otherwise, the probability would be high that the nodes would continuously send spawning requests during each other's waiting period and neither would ever be able to complete the spawning procedure. For example, the random time may be selected from a range that is 2×-10× longer than the predetermined period of time.

While there is a chance that conflict could occur again, provided that the range from which the random period is selected is large enough, the probability of another conflict arising could be reduced to any arbitrarily small chance. Furthermore, in some embodiments, the range of times that the random period is selected from could be lengthened based on the number of conflicts that have occurred in a row. For example, the range may be multiplied by the number of conflicts in a row that have been detected. Thus, as the number of conflicts in a row increase, the probability of the next conflict occurring decreases until one of the nodes eventually succeeds.

At block 305, in response to a determination that the predetermined period of time has elapsed, the current node spawns a new node and gives the new node a portion of the load. In an embodiment, when the predetermined period of time elapses without the load decreasing below the threshold or receiving a spawning request from a neighbor the current node spawns a new node. In some embodiments, the current node provides the spawned node with an address at which the current node may be contacted. Further, in some embodiments, the current node may furnish the spawned node with addresses at which the known neighbors of the spawning node may be contacted or wait for a request from the spawned node for the addresses of the neighbors. Furthermore, in some embodiments, the current node may send a message informing its neighbors of the newly spawned node and the districts for which the newly spawned node is responsible. Upon receiving the aforementioned message, the neighboring nodes update their respective district matrix to reflect the district exchange. The manner of spawning may differ depending on the exact nature of the node. For example, if the nodes represent virtual machines, spawning may be performed by contacting a third party service provider to spin up a new virtual machine.

As another example, if the nodes represent individual processes, the new node may be created by forking a new process. In an embodiment, once the new node is spawned, the current node provides the new node with a portion of the load and an address at which the current node can be reached. For example, the current node may give the new node half of its districts or may assign districts to the new node in order to balance the total load between the two nodes. Once the new node receives the assigned districts and the address of the current node, the new node updates its respective district matrix and metadata to reflect the received information.

3.3 Termination

Figure 4:
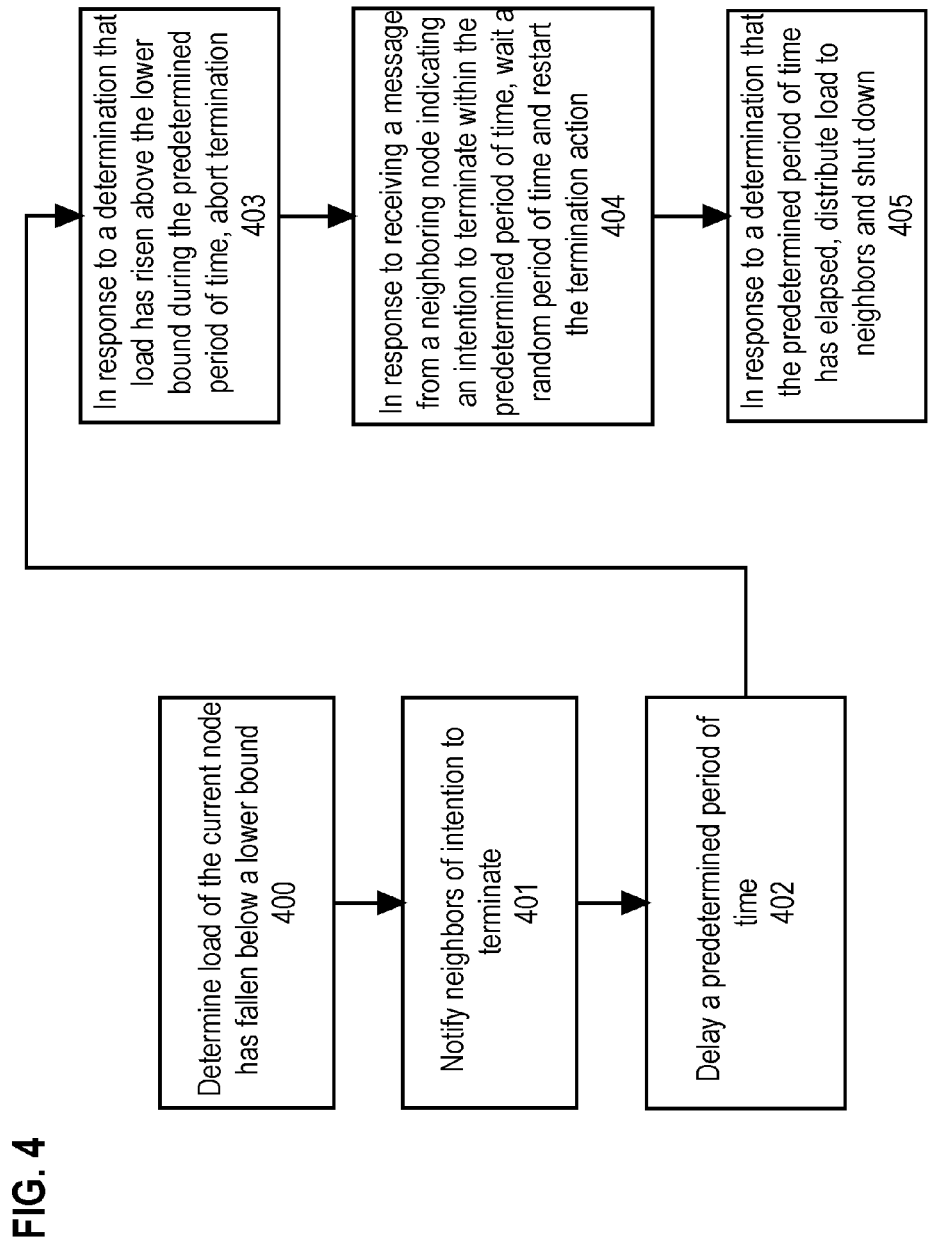
FIG. 4 illustrates a process for terminating an existing node in block diagram form according to an embodiment.

FIG. 4 illustrates a process for determining when to terminate in block diagram form according to an embodiment. In an embodiment, the process illustrated in FIG. 4 is represented by a set of program instructions which, when executed by the current node, causes the current node to perform the steps of FIG. 4. Although the steps depicted in FIG. 4 are presented in a particular order, other embodiments may combine steps, separate out steps, or reorder steps in comparison to FIG. 4. In an embodiment, the process illustrated in FIG. 4 is performed by the virtual machines 105 executing in the operating environment of FIG. 1.

At block 400, the current node determines that its load has fallen below a lower threshold. In an embodiment, the current node maintains a predetermined lower bound value of load that is considered "acceptable" for the problem domain. The exact threshold for the lower bound value is highly dependent on the problem domain and may vary between embodiments.

At block 401, the current node notifies neighbors of its intention to terminate. In an embodiment, the current node consults its metadata for known neighbors and sends a message to each of the known neighbors identifying the intention to terminate.

At block 402, the current node delays a predetermined amount of time. In an embodiment, the current node waits a predetermined amount of time in order to allow the load to rise back over the lower bound value before following through with the termination and to give neighboring nodes a chance to send their own termination requests. The former case hedges against having a significant amount of churn that may result if the termination occurs immediately after the lower bound value is violated, even if that violation is very brief. In such cases the termination of the current node and redistribution of the districts belonging to the current node may cause neighboring nodes to subsequently spawn, causing additional overhead that could otherwise be avoided. The latter case hedges against neighbors proceeding with their own termination requests concurrently, potentially resulting a shortage of nodes to handle the current load. Furthermore, there is a risk that if only two nodes presently exist within the distributed system and both decide to simultaneously terminate, there may be no nodes left to handle requests.

At block 403, in response to a determination that load has risen above the lower bound value during the predetermined period of time, the current node aborts the termination. While the current node is delaying for the predetermined period of time, the current node monitors the present load. If the present load rises above the lower bound value prior to the expiration of the predetermined period of time, the current node aborts the termination process illustrated in FIG. 4.

At block 404, in response to receiving a message from a neighboring node indicating an intention to terminate within the predetermined period of time, the current node waits a random period of time before restarting the spawning action. While the current node is delaying for the predetermined period of time, the current node continues to accept messages from neighboring nodes, such as balancing, spawning, neighbor detection, and/or termination requests. If the current node receives a termination request from a neighboring node during the waiting period, the current node enters into conflict resolution with the node which sent the termination request.

During conflict resolution, the current node waits a random period of time before restarting the termination process by returning to block 400. In an embodiment, the range of time periods from which the current node selects the random period of time is set to be at least longer than the waiting period before following through with the termination. Otherwise, the probability would be high that the nodes would continuously send termination requests during the waiting period of the other node and neither would ever be able to complete the termination procedure. For example, the random period may be selected from a range that is 2×-10× longer than the predetermined period of time. While there is a chance that conflict could occur again, provided that the range from which the random period is selected is large enough, the probability of another conflict arising could be reduced to any arbitrarily small chance. Furthermore, in some embodiments, the range of times that the random period is selected from could be lengthened based on the number of conflicts. For example, the range may be multiplied by the number of conflicts in a row that have been detected. Thus, as the number of conflicts in a row increase, the probability of the next conflict occurring decreases until one of the nodes eventually succeeds.

At block 405, in response to a determination that the predetermined period of time has elapsed, the current node distributes its load to the neighbors and shuts down. In an embodiment, the distribution of load to the neighbors takes the form of passing responsibility for districts to the neighboring nodes. For example, the neighboring nodes may each receive an equal number of districts or a number of districts which represent an even distribution of load among the neighbors. In some embodiments, the distribution of the districts ensures that the total districts assigned to each neighbor remains contiguous. For example, in some embodiments the current node may give all of its districts to one of the neighboring nodes and then rely on that neighboring node to distribute districts to its neighbors during balancing. As another example, the balancing technique described below in Section 3.4 could be utilized by the current node to determine the "best" way to divide the districts. In such embodiments, the fitness function prevents solutions that would assign districts to nodes in a non-contiguous manner, with the exception that the fitness function would also require the terminating node to be responsible for zero districts. In some embodiments, the current node broadcasts to its neighbors a message indicating that it is terminating which includes the districts being distributed and the new owners of those districts. In response to receiving the aforementioned message, nodes update their respective district matrix to reflect the district exchange.

3.4 Balancing

Figure 5:
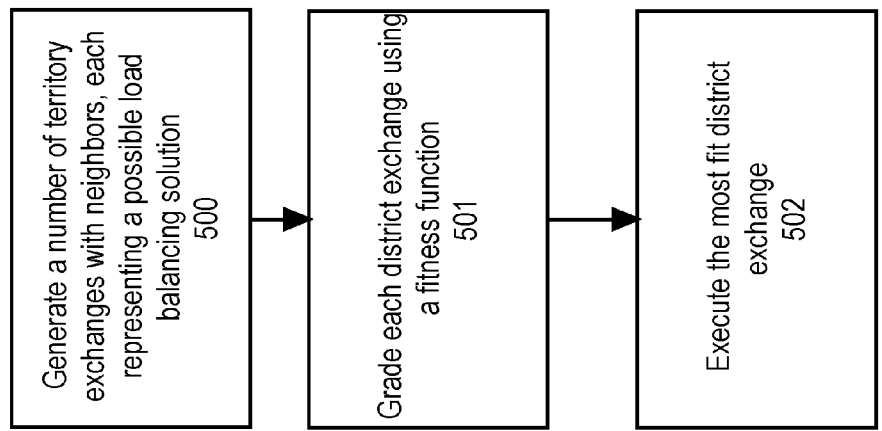
FIG. 5 illustrates a process for balancing load between neighboring nodes in block diagram form according to an embodiment.

FIG. 5 illustrates a process for balancing load between neighboring nodes in block diagram form according to an embodiment. In an embodiment, the process illustrated in FIG. 5 is represented by a set of program instructions which, when executed by the current node, causes the current node to perform the steps of FIG. 5. Although the steps depicted in FIG. 5 are presented in a particular order, other embodiments may combine steps, separate out steps, or reorder steps in comparison to FIG. 5. In an embodiment, the process illustrated in FIG. 5 is performed by the virtual machines 105 executing in the operating environment of FIG. 1.

At block 500, the current node generates a number of district exchanges with neighboring nodes. Each state (assignment of districts to nodes) that results from the district exchanges represents a potential solution to the load balancing problem. In an embodiment, each of the district exchanges are produced by applying a number of "mutations" to the assignment of districts to the current node and the surrounding neighboring nodes. The number of mutations to apply may be predetermined or may be generated randomly (e.g. randomly applying between 1-20 mutations).

For example, to generate each district exchange, the current node may randomly select n number of districts to propose shifting which represents the number of mutations to apply. The current node then identifies the districts which make up the border between the current node and its neighbors. From the border districts the current node randomly selects n districts to propose transferring (e.g. if the selected district belongs to a neighbor it is transferred to the current node and vice versa). In some embodiments, the border nodes are updated with each proposed transfer to ensure that the border nodes are consistent with the districts that would be transferred should the solution be selected and applied by the current node. Although this example chooses districts from the border in order to help provide consistency, other embodiments may rely solely on the fitness function to weed out incompatible solutions or may allow nodes to be assigned non-contiguous districts. Furthermore, the above example may not be sufficient in all cases to weed out non-contiguous district assignments, thus some embodiments may include a fitness function that ensures contiguity in addition to selecting territories from the border. In some embodiments, instead of a unilateral transfer of a district, there is a predefined percent chance (e.g. 30%) that two districts will be randomly chosen (e.g. along the border or otherwise), one belonging to a neighbor and one belonging to the current node, which are swapped in a bidirectional transfer. In some empirical testing allowing bidirectional transfer has been shown to speed up convergence when searching for the optimal solution to the load balancing problem.

At block 501, the current node grades each district exchange produced at block 500. In an embodiment, each district exchange is graded by applying a fitness function to the state that results from executing the changes in district assignments represented by the district exchange. The fitness function may rely on a wide variety of factors, many if not all of which will be dependent on the exact operating environment on which the techniques are implemented and the exact problem domain. In the operating environment of FIG. 1, which pertains to assigning made-to-order food deliveries to driver clients, the factors may include favoring roundness over gerrymandering (long snake-like regions), penalties for running a boundary through a dense area (area with a high-density of load), equalizing load between neighboring nodes, and maintaining contiguous regions. Favoring roundness over gerrymandering helps prevent the situation where long snake-like regions are assigned to a node, which may be difficult for the algorithm to backtrack from as load changes over time. Penalizing the running of a boundary through a dense area prevents the chance that driver clients may leave the area of responsibility of a particular node and enter the territory of a different node. For example, a city such as New York may take up multiple districts and be under heavy load. However, since New York is a single metropolitan area, drivers may often cross those boundaries between districts to pick up and deliver food. Since the transfer of service from one node to another node requires communication and processing overhead, in many cases it is more efficient to try to keep densely loaded areas that are close in geographic space under the control of a single node. Load balancing ensures that the load is evenly distributed across the current node and its neighbors. Contiguousness serves to reduce the complexity of keeping track of neighbors, since each node is responsible for a single contiguous region rather than many small islands of districts.

As non-limiting example, the fitness function may be as follows,

If each node is assigned a contiguous region of districts:

$$GRADE=(LD)^2+(BAR*10)^4+(BD)*40$$

If each node is not assigned a contiguous region of districts:

$$GRADE=\infty$$

where GRADE is the value of the fitness function, LD is the difference in load between the current node and the neighbors, BAR is the border to area ratio of the current node, and BD is the density on both sides of the border between the current node and its neighbors. In the example equation above GRADE is a measurement of penalties, thus the most "fit" solution is the one with the lowest GRADE. However, the equation could be rearranged to where the grade is the negative of the equation on the right side of the assignment, thus rendering the solution with the highest fitness as the one with the highest GRADE. The branch on whether each node is assigned a contiguous region by the districts acts as a form of hard constraint. Any solution which violates that constraint is thus given the worst possible grade for fitness to ensure those solutions have virtually no chance of being selected to carry over onto the next iteration. However, in other embodiments, the generic operator applied at block 500 may be designed to only produce solutions where each node is responsible for a contiguous area. In such embodiments, the branch would not be needed since the hard constraint could not be violated at the time the generated solutions are evaluated at block 501. In some embodiments, BD is computed by taking the sum of the product of the load for districts on each side of the boundary between the current node and its neighbors. For example, the current node may for each pair of neighboring districts along the border, calculate the product of the load of that pair and then sum over all the paired nodes along the border.

At block 502, the current node executes the solution with the highest fitness. In an embodiment, the current node finds the solution which received the highest or lowest grade depending on whether the fitness function utilized at block 501 associates better fitness with higher or lower grades. Once the solution with the highest fitness has been identified, the current node sends a message to the neighboring nodes that will have their districts transferred to reach the identified solution. The message identifies each district that will be transferred, such as by providing a list with the [x,y] coordinates of the transferred districts and an identifier indicating which node will take responsibility for each of the respective districts. The current node and the neighboring nodes then each update their respective district matrices to reflect the state of the identified solution. In some cases, there is a risk that by the time the current node attempts to execute the solution with the highest fitness, the ownership of the affected districts may have already changed hands due to the balancing, spawning, or termination actions of other nodes. In some embodiments, this risk is mitigated or reduced by acquiring a lock on the districts with its neighbors to prevent those districts from changing hands. Alternatively, the node proposing the change may pass along data representing the knowledge that the current node has of the ownership of the affected districts and, if the ownership of those districts has changed, the receiving node rejects the request and the proposed solution is not executed. In some embodiments, the current node, upon executing the solution with the highest fitness, sends a message to its neighbors (or the neighbors known to share a border with the exchanged districts) identifying the districts that were exchanged and the new owner of those districts. A node which receives the aforementioned message updates its respective district matrix to reflect the current ownership of the districts.

4.0 Runtime Example

In this section, an illustrative example is presented showing the change in district assignments as a result of spawning, termination, and load balancing. The example presented is not dispositive and is only intended to show one possible run-time execution of the aforementioned actions. In a practical implementation, the changes in district assignments and the order in which nodes progress through the actions may vary significantly from the example presented in this section.

Figure 7:
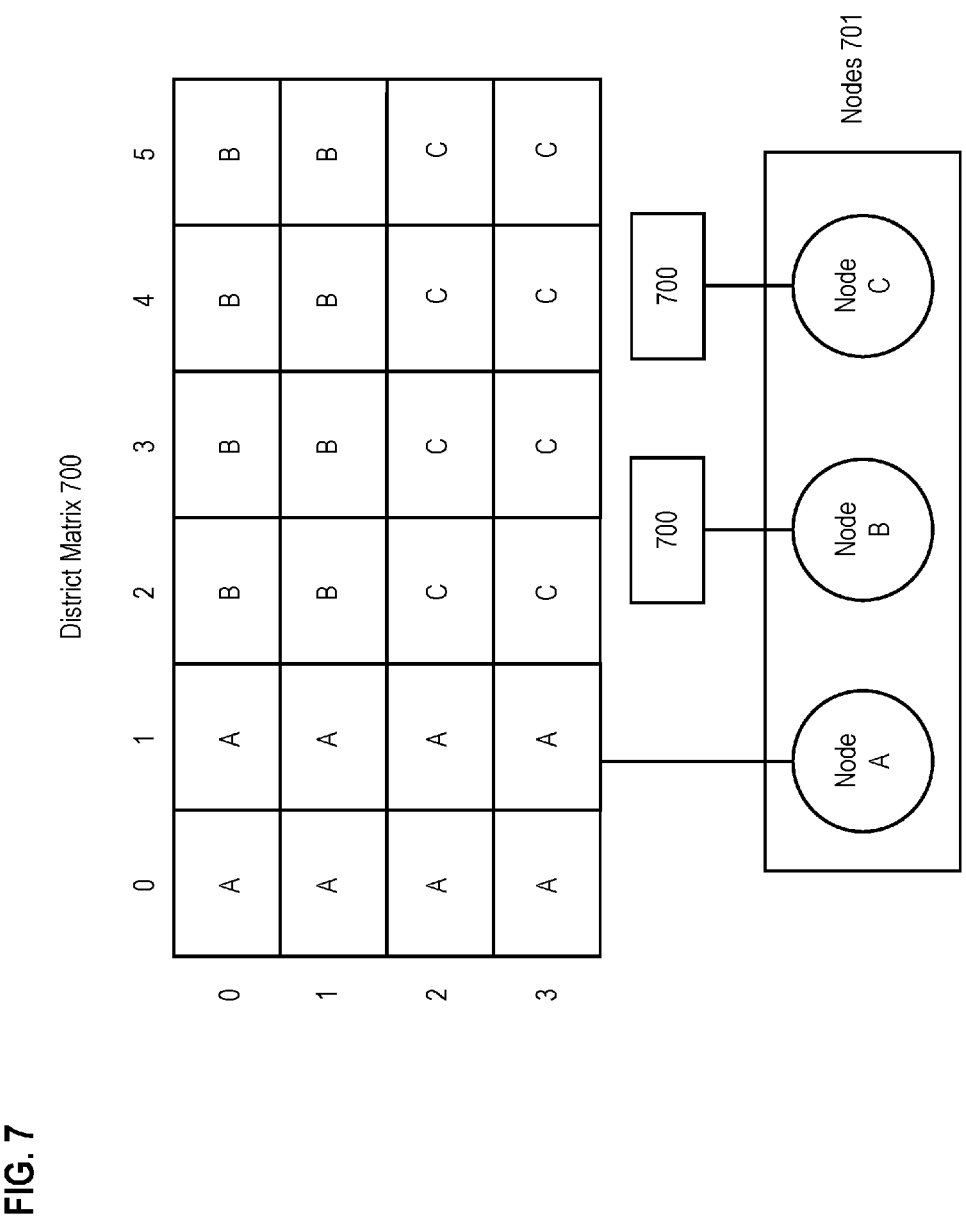
FIG. 7 illustrates a first view of a run-time example showing an initial state of district assignments according to an embodiment.

FIG. 7 illustrates a first view of a run-time example showing an initial state of district assignments according to an embodiment.

In FIG. 7, each of node A, node B, and node C (collectively nodes 701) store or have access to a respective district matrix 700 that identifies the districts for which each node is responsible and the districts for which their neighbors are responsible. In the initial state, node A is responsible for the districts with indices ranging from x=0 to x=1 and y=0 to y=3, node B is responsible for districts with indices ranging from x=2 to x=5 and y=0 to y=1, and node C is responsible for districts with indices ranging from x=2 to x=5 and y=2 to y=3. Since each of the nodes 701 share a border with the other, each is considered a neighbor of the other.

The creation and maintenance of the district matrix 700 for each of the nodes 701 may be performed as described above with respect to the neighbor detection action. In some embodiments, due to latency in passing messages back and forth between the nodes 701, the district matrix 700 stored by each node may be unsynchronized with its neighboring nodes. Thus, the respective district matrix 700 for node B and node C may not always exactly mirror the district matrix 700 illustrated for node A. However, during the neighbor detection action (as described above) the nodes 701 synchronize their respective district matrix 700 with the state as known by their neighbors.

Figure 8:
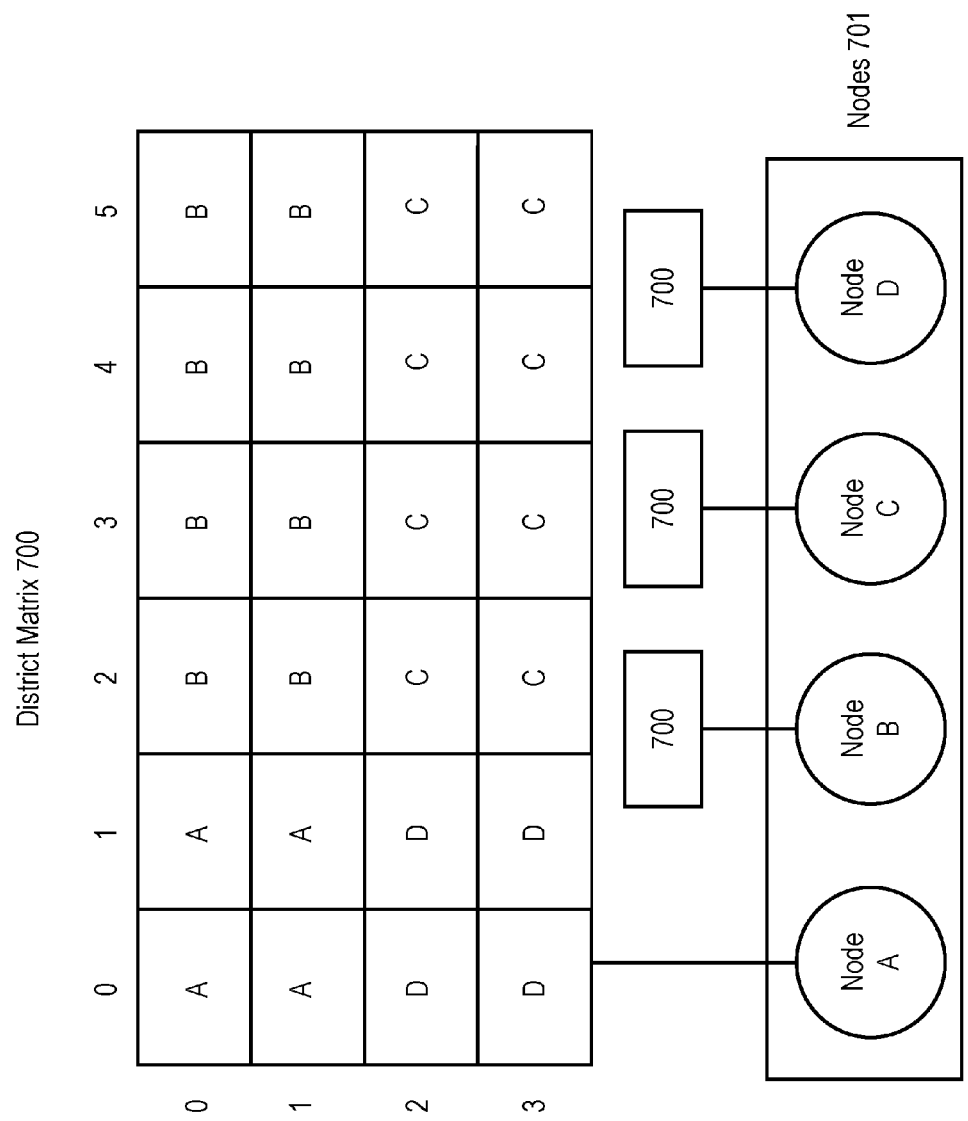
FIG. 8 illustrates a second view of a run-time example showing a node being spawned according to an embodiment.

FIG. 8 illustrates a second view of a run-time example showing a node being spawned according to an embodiment. In FIG. 8, Node A has performed a spawning action in response to a determination that the districts under its control represented load which exceeded an upper bound value. In response, Node A spawned Node D and gave Node D responsibility for the districts ranging from the indices x=0 to x=1 and y=0 to y=1.

Figure 9:
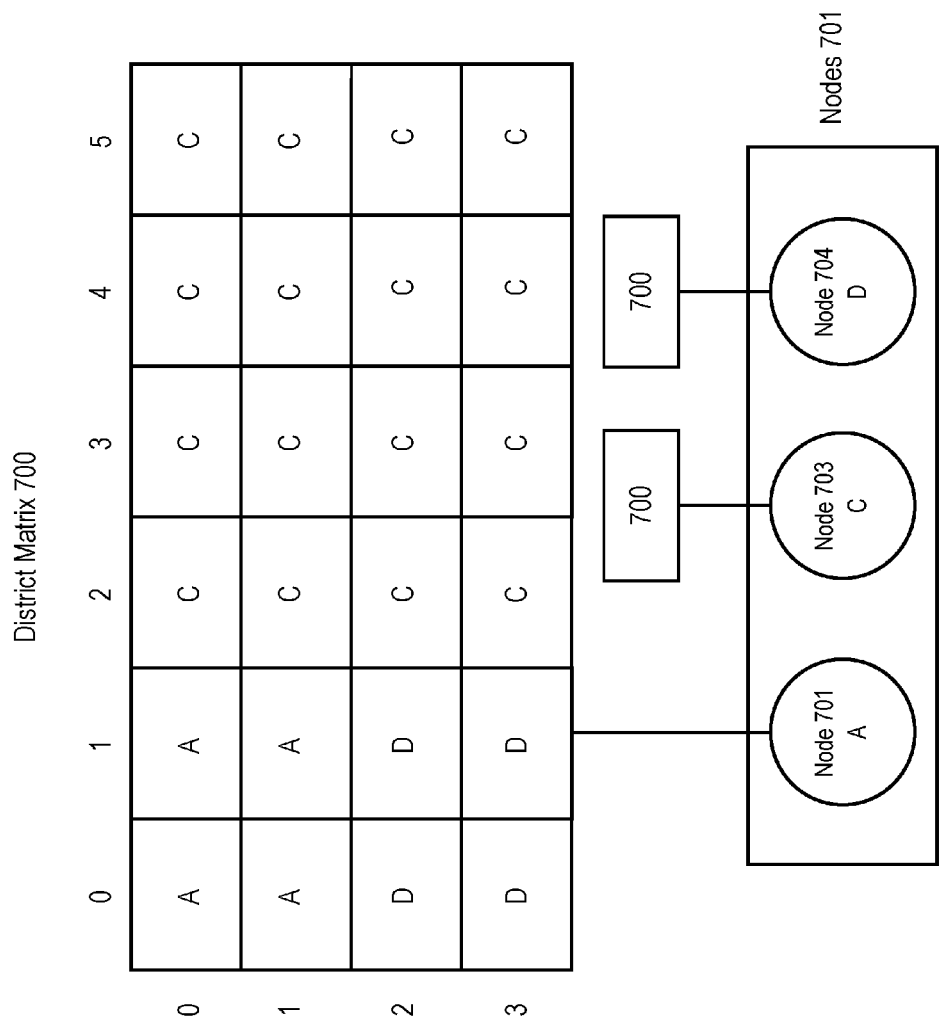
FIG. 9 illustrates a third view of a run-time example showing a node being terminated according to an embodiment.

FIG. 9 illustrates a third view of a run-time example showing a node being terminated according to an embodiment. In FIG. 9, Node B determined that its load had fallen below a lower bound value, terminated, and gave responsibility for its districts to Node C. FIG. 9 represents an embodiment where a node gives its load to a single node upon termination, but in other embodiments the load may be spread throughout all or part of the neighbors.

Figure 10:
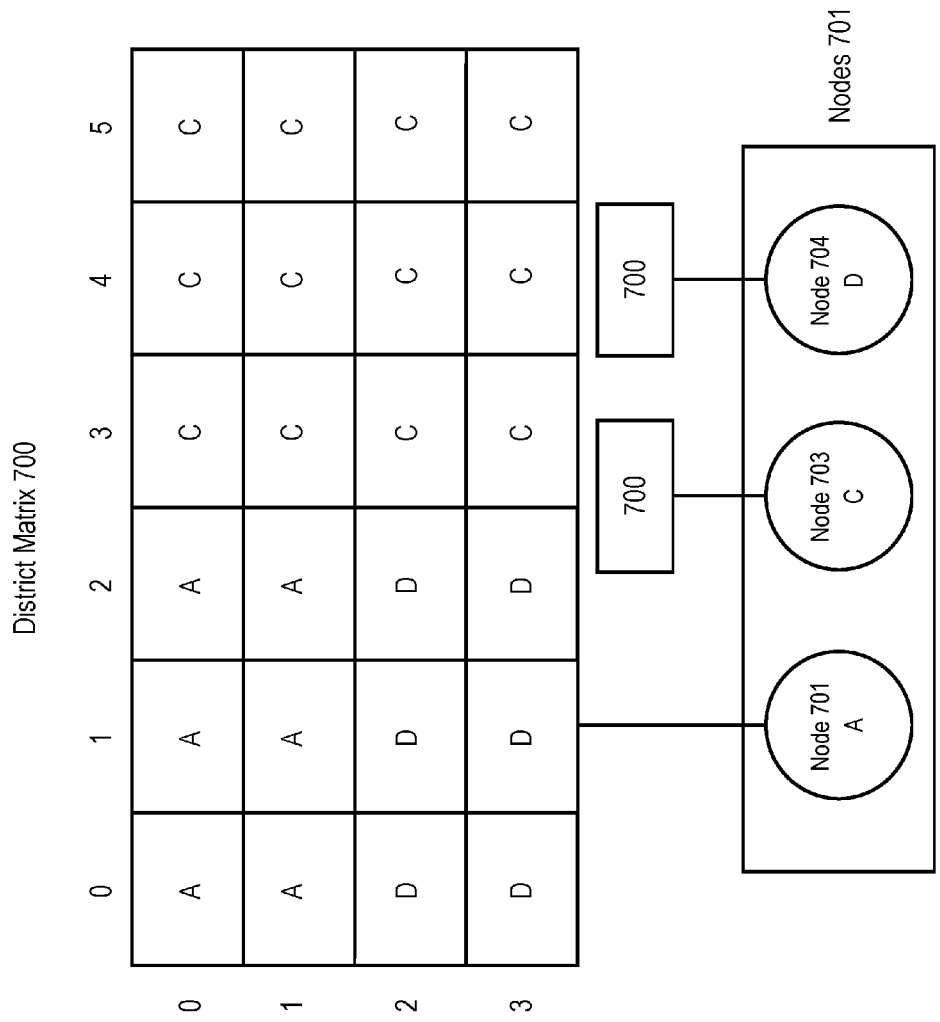
FIG. 10 illustrates a fourth view of a run-time example showing load balancing being performed between neighbors according to an embodiment.

FIG. 10 illustrates a fourth view of a run-time example showing load balancing being performed between neighbors according to an embodiment. In FIG. 10, Node C performed a balancing action which resulted in districts at indices [x=2, y=0] and [x=2, y=1] being transferred to node A and districts at indices [x=2, y=2] and [x=2, y=3] being transferred to Node D. As mentioned above, the aforementioned transfers may be determined based on generating a number of potential district exchanges and then choosing the district exchange that is most fit based on a number of factors. In the example of FIG. 10, the state of district matrix 700 as depicted is assumed to be the most fit exchange that node D generated. However, due to the random nature of the generic algorithm discussed in Section 3.4, different runs using the same starting state may result in different transfers of districts being performed compared to the illustration presented in FIG. 10.

5.0 Other Embodiments

In many of the examples above, the geographic regions for which each node is responsible is assumed to represent as a grid, where each district of the grid is assigned to a node. However, the grid representation is not critical for performing the techniques disclosed herein. In an alternative embodiment, the grid representation can instead be replaced by representing regions of responsibility with latitude and longitude points. Thus, for example, the district for which a node is responsible may be represented as a collection of points demarcating the boundary of that district. Thus, while performing balancing, the mutation applied to generate the district exchanges could include actions such as (1) Remove Point, (2) Add Point, (3) Move Point, and (4) Merge Points. Thus, in this alternative embodiment, rather than exchanging districts on a grid, the points demarking the territory for which each node is responsible could be shifted over time to cover areas of approximately equal load. In some embodiments, the mutations take into consideration rules that keep the areas contiguous as well as ensuring that adding or removing a point does not cause a region to become a line or areas to be skipped. For example, a node may start with a single initial district and recursively count all districts that touch it and are part of the same area. If the number of touching districts is less than the total count of responsibility, then contiguity is broken.

6.0 Other Use Cases

In the running example above, the techniques described herein are applied to an operating environment that is configured to assign orders to driver clients 150. However, there are many different other operating environments and problem domains to which the techniques described herein may be applied.

In an embodiment, the techniques described herein are applied to search solutions. Search solutions often place items in geographical regions, which for example can be represented in a district matrix as described above. The geographical regions may be based on real geography or by mapping concepts onto a set of coordinates in N-dimensional space. As a result, the nodes (e.g. virtual machine, server, server cluster, and so forth) that receive search requests and perform the search can be divided based on the geographical regions. For example, the nodes may be configured to take requests from browser clients that are located in certain real geographical regions. As another example, the search query may be broken down into coordinates in an N-dimensional space and each node can be responsible for serving queries which fall within different regions of the N-dimensional space. In essence, this would add dynamic bucketing to improve sharding and search speed.

In an embodiment, the techniques described herein are applied to storage solutions. For example, the nodes may represent hard drive disks, databases, database servers, and so forth that receive Input/Output (IO) requests and perform the received request. The requests may be divided along real geography of the client sending the request or based on the index accessed by those requests. For example, the nodes may represent processes or threads executing on a database server that accesses a plurality of hard drive disks. Different processes or threads may be assigned different hard drive disks for which to execute IO requests or particular regions within those hard drive disks. Those regions then represent the districts which can be balanced and/or traded using the techniques described herein to balance the load on each process or thread.

7.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
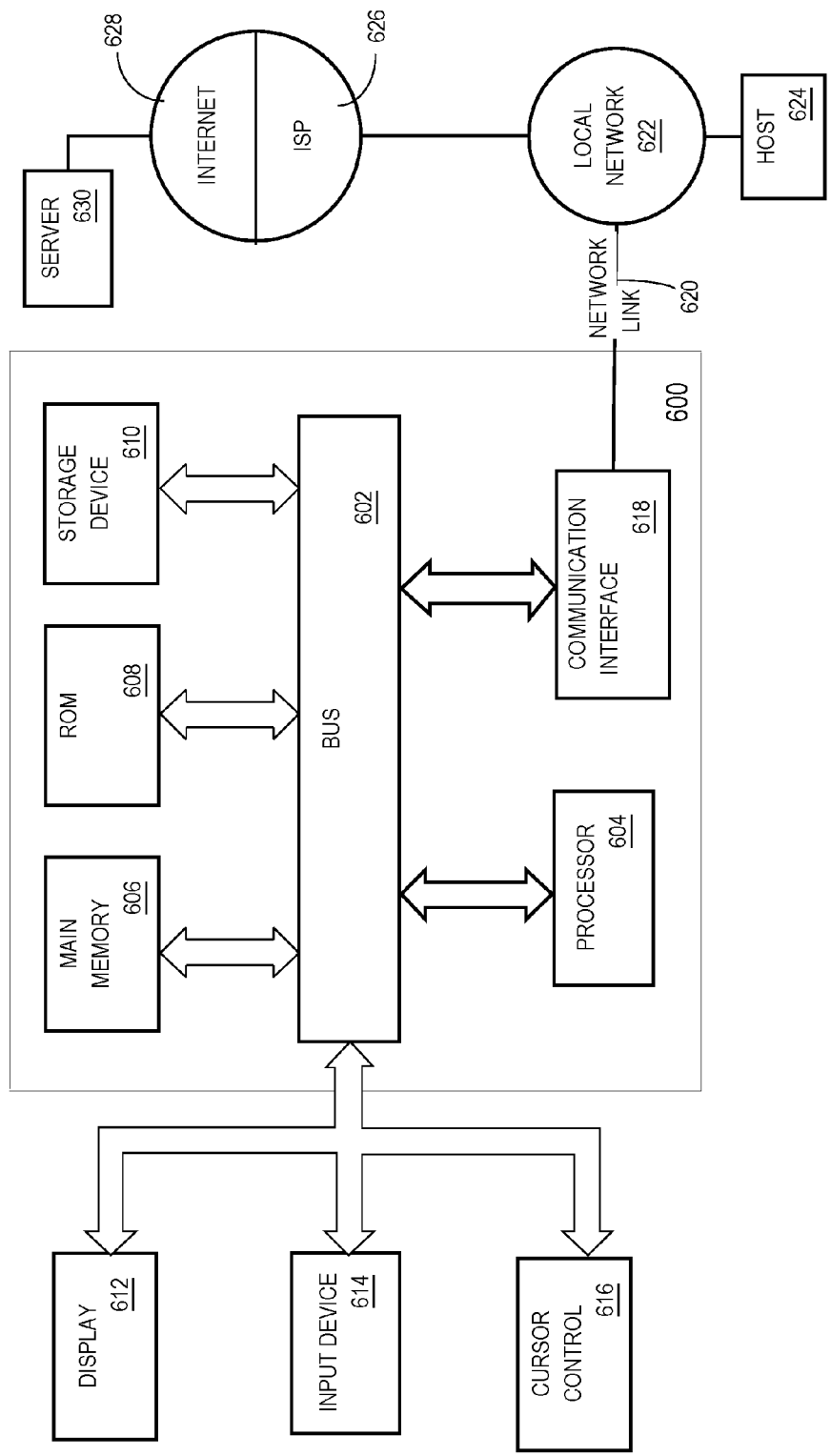
FIG. 6 illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infrared data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

8.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

9.0 Additional Disclosure

Additional embodiments are described by the following numbered clauses:

1. A method comprising: storing, by a particular node, district data identifying one or more districts of a geographical region for which the particular node is responsible for processing requests, wherein the particular node is a member of one or more nodes, wherein each node of the one or more nodes represents a computational resource; receiving, by the particular node, one or more requests associated with the one or more districts for which the particular node is responsible and processing the one or more requests; periodically updating, by the particular node, the district data to reflect one or more respective districts for which each of one or more neighboring nodes of the particular node is responsible; periodically determining, by the particular node, whether current load of the particular node has dropped below a lower bound value and in response to determining that the current load has dropped below the lower bound value initiating a termination action; periodically determining, by the particular node, whether the current load has risen above an upper bound value and in response to determining that the current load has risen above the upper bound value initiating a spawning action; periodically balancing load, by the particular node, with the one or more neighboring nodes by exchanging a set of districts with the one or more neighboring nodes.

2. The method of Clause 1, wherein periodically updating the district data includes: sending one or more messages to the one or more neighboring nodes requesting districts for which the one or more neighboring nodes are responsible; in response to receiving a response from a particular neighboring node of the one or more neighboring nodes that identifies districts for which the particular neighboring node is responsible, updating the district data based on the identified districts; in response to failing to receive a response from the particular neighboring node for a length of time, assuming responsibility for one or more districts for which the particular neighboring node was formerly responsible and updating the district data to reflect that the particular node has assumed responsibility for the one or more districts for which the particular neighboring node was formerly responsible.

3. The method of any of Clauses 1-2, wherein the termination action includes: waiting a period of time; in response to determining that a message is received from a neighboring node that indicates an intention to terminate within the period of time, entering into conflict resolution with the neighboring node; in response to determining that the current load has risen above the lower bound value within the period of time, aborting the termination action; in response to determining that the period of time has passed, assigning the one or more districts for which the particular node is responsible to the one or more neighboring nodes and terminating.

4. The method of Clause 3, wherein the conflict resolution involves selecting a random period of time to wait before restarting the termination action and in response to determining that the random period of time has passed restarting the termination action.

5. The method of any of Clauses 1-4, wherein the spawning action includes: waiting a period of time; in response to determining that a message is received from a neighboring node that indicates an intention to spawn within the period of time, entering into conflict resolution with the neighboring node; in response to determining that the current load has fallen below the upper bound value within the period of time, aborting the spawning action; in response to determining that the period of time has passed, spawning a new node and assigning a portion of the one or more districts for which the particular node is responsible to the new node.

6. The method of Clause 5, wherein the conflict resolution involves selecting a random period of time to wait before restarting the spawning action and in response to determining that the random period of time has passed restarting the spawning action.

7. The method of any of Clauses 1-6, wherein balancing the load with the one or more neighboring nodes involves: generating one or more district exchanges between the particular node and the one or more neighboring nodes, wherein each district exchange of the one or more district exchanges is generated based on a random transfer of one or more districts between the particular node and the one or more neighboring nodes; evaluating fitness of each district exchange of the one or more district exchanges to determine a most fit district exchange; executing the most fit district exchange.

8. The method of Clause 7, wherein evaluating fitness is performed based on one or more of: contiguity of respective districts for which the particular node and the one or more neighboring nodes will be responsible after the district exchange is executed, difference in loads between the particular node and the one or more neighboring nodes after the district exchange is executed, border to area ratio of the respective districts for which the particular node and the one or more neighboring nodes will be responsible after the district exchange is executed, density on both sides of a border between the particular node and the one or more neighboring nodes after the district exchange is executed.

9. The method of Clause 8, wherein the random transfer of the one or more districts between the particular node and the one or more neighboring nodes has a chance to swap responsibility of a district for which the particular node is responsible and a district for which a neighboring node of the particular node is responsible.

10. The method of any of Clauses 8-9, wherein executing the most fit district exchange involves sending a message to each particular neighbor of neighboring nodes which exchange one or more districts under the most fit district exchange, the message identifying the one or more districts that are to be exchanged between the particular neighbor and the particular node.

11. A method comprising: storing, by a particular computer, district data identifying one or more districts of a geographical region for which the particular computer is responsible for processing requests, wherein the particular computer is a member of a plurality of computers; receiving by the particular computer one or more requests associated with the one or more districts for which the particular computer is responsible and processing the one or more requests; periodically updating the district data by the particular computer to reflect one or more respective districts for which each of one or more neighboring computers of the particular computer is responsible; periodically determining by the particular computer whether current load of the particular computer has dropped below a lower bound value and in response to determining that the current load has dropped below the lower bound value initiating a termination action; periodically determining by the particular computer whether the current load has risen above an upper bound value and in response to determining that the current load has risen above the upper bound value initiating a spawning action; periodically balancing load with the one or more neighboring computers by exchanging, with the one or more neighboring computers, district set data identifying a set of districts.

12. A method comprising: storing, by a particular diner client, district data identifying one or more districts of a geographical region for which the particular diner client is responsible for processing requests, wherein the particular diner client is a member of a plurality of diner clients; sending a message to an order receiving server that represents an order for food delivery; wherein the order receiving server is communicatively coupled to a non-transitory computer-readable storage medium storing one or more instructions which, when executed by the order receiving server, causes the order receiving to perform: receiving the message from the particular diner client, and storing an entry identifying the order for food delivery in an order database; one or more virtual machines executing within an order assignment server cluster, wherein each virtual machine of the one or more virtual machines has accessed to respective district data identifying one or more districts of a geographical region for which the virtual machine is responsible for processing requests, wherein the order assignment server cluster is communicatively coupled to one or more non-transitory computer-readable storage mediums that each store one or more instructions which, when executed by a particular virtual machine of the one or more virtual machines, causes the particular virtual machine to perform: retrieving one or more orders for food delivery from the order database based on a respective delivery address associated with each of the one or more orders and district data associated with the particular virtual machine and assigning each of the one or more orders for food delivery to a respective driver client of one or more driver clients; periodically updating the district data to reflect one or more respective districts for which each of one or more neighboring virtual machines of the particular virtual machine is responsible; periodically determining whether current load of the particular virtual machine has dropped below a lower bound value and in response to determining that the current load has dropped below the lower bound value initiating a termination action; periodically determining whether the current load has risen above an upper bound value and in response to determining that the current load has risen above the upper bound value initiating a spawning action; periodically balancing load with the one or more neighboring virtual machines by exchanging a set of districts with the one or more neighboring virtual machines; wherein the one or more driver clients are each communicatively coupled to a respective non-transitory computer-readable storage medium storing one or more instructions which, when executed by a particular driver client of the one or more driver clients causes the particular driver client to perform: receiving an assignment of an order sent by a virtual machine of the one or more virtual machines and, in response to receiving the assignment, displaying one or more details of the order within a user interface of the particular driver client.

13. One or more non-transitory computer-readable media storing instructions that, when executed by one or more computing devices, causes performance of any one of the methods recited in Clauses 1-12.

14. A system comprising one or more computing devices comprising components, implemented at least partially by computing hardware, configured to implement the steps of any one of the methods recited in Clauses 1-12.

What is claimed is:
1. A computer system comprising:
one or more nodes, wherein each node of the one or more nodes is a computational resource and is programmed to store district data identifying one or more districts of a geographical region for which the node is responsible for processing requests;
one or more non-transitory computer readable storage media that are communicatively coupled to the one or more nodes and store one or more sequences of program instructions which, when executed by a particular node of the one or more nodes, causes the particular node to perform:
receiving one or more requests associated with the one or more districts for which the particular node is responsible and processing the one or more requests;
periodically updating the district data to reflect one or more respective districts for which each of one or more neighboring nodes of the particular node is responsible;

periodically determining whether current load of the particular node has dropped below a lower bound value and in response to determining that the current load has dropped below the lower bound value initiating a termination action;

periodically determining whether the current load has risen above an upper bound value and in response to determining that the current load has risen above the upper bound value initiating a spawning action;

periodically balancing load with the one or more neighboring nodes by exchanging a set of districts with the one or more neighboring nodes.

2. The system of claim 1, wherein periodically updating the district data includes:

sending one or more messages to the one or more neighboring nodes requesting districts for which the one or more neighboring nodes are responsible;

in response to receiving a response from a particular neighboring node of the one or more neighboring nodes that identifies districts for which the particular neighboring node is responsible, updating the district data based on the identified districts;

in response to failing to receive a response from the particular neighboring node for a length of time, assuming responsibility for one or more districts for which the particular neighboring node was formerly responsible and updating the district data to reflect that the particular node has assumed responsibility for the one or more districts for which the particular neighboring node was formerly responsible.

3. The system of claim 1, wherein the termination action includes:

waiting a period of time;

in response to determining that a message is received from a neighboring node that indicates an intention to terminate within the period of time, entering into conflict resolution with the neighboring node;

in response to determining that the current load has risen above the lower bound value within the period of time, aborting the termination action;

in response to determining that the period of time has passed, assigning the one or more districts for which the particular node is responsible to the one or more neighboring nodes and terminating.

4. The system of claim 3, wherein the conflict resolution involves selecting a random period of time to wait before restarting the termination action and in response to determining that the random period of time has passed restarting the termination action.

5. The system of claim 1, wherein the spawning action includes:

waiting a period of time;

in response to determining that a message is received from a neighboring node that indicates an intention to spawn within the period of time, entering into conflict resolution with the neighboring node;

in response to determining that the current load has fallen below the upper bound value within the period of time, aborting the spawning action;

in response to determining that the period of time has passed, spawning a new node and assigning a portion of the one or more districts for which the particular node is responsible to the new node.

6. The system of claim 5, wherein the conflict resolution involves selecting a random period of time to wait before restarting the spawning action and in response to determining that the random period of time has passed restarting the spawning action.

7. The system of claim 1, wherein balancing the load with the one or more neighboring nodes involves:

generating one or more district exchanges between the particular node and the one or more neighboring nodes, wherein each district exchange of the one or more district exchanges is generated based on a random transfer of one or more districts between the particular node and the one or more neighboring nodes;

evaluating fitness of each district exchange of the one or more district exchanges to determine a most fit district exchange;

executing the most fit district exchange.

8. The system of claim 7, wherein evaluating fitness is performed based on one or more of: contiguity of respective districts for which the particular node and the one or more neighboring nodes will be responsible after the district exchange is executed, difference in loads between the particular node and the one or more neighboring nodes after the district exchange is executed, border to area ratio of the respective districts for which the particular node and the one or more neighboring nodes will be responsible after the district exchange is executed, density on both sides of a border between the particular node and the one or more neighboring nodes after the district exchange is executed.

9. The system of claim 8, wherein the random transfer of the one or more districts between the particular node and the one or more neighboring nodes has a chance to swap responsibility of a district for which the particular node is responsible and a district for which a neighboring node of the particular node is responsible.

10. The system of claim 8, wherein executing the most fit district exchange involves sending a message to each particular neighbor of neighboring nodes which exchange one or more districts under the most fit district exchange, the message identifying the one or more districts that are to be exchanged between the particular neighbor and the particular node.

11. The system of claim 1, wherein each node of the one or more nodes represents a computer.

12. A computer system comprising:

one or more diner clients, wherein each diner client of the one or more diner clients is communicatively coupled to a respective non-transitory computer-readable storage medium storing one or more instructions which, when executed by a particular diner client of the one or more diner clients, causes the particular diner client to perform:

sending a message to an order receiving server that represents an order for food delivery;

wherein the order receiving server is communicatively coupled to a non-transitory computer-readable storage medium storing one or more instructions which, when executed by the order receiving server, causes the order receiving to perform:

receiving the message from the particular diner client, and storing an entry identifying the order for food delivery in an order database;

one or more virtual machines executing within an order assignment server cluster, wherein each virtual machine of the one or more virtual machines has accessed to respective district data identifying one or more districts of a geographical region for which the virtual machine is responsible for processing requests, wherein the order assignment server cluster is communicatively coupled to one or more non-transitory computer-readable storage mediums that each store one or more instructions which, when executed by a particular virtual machine of the one or more virtual machines, causes the particular virtual machine to perform:
retrieving one or more orders for food delivery from the order database based on a respective delivery address associated with each of the one or more orders and district data associated with the particular virtual machine and assigning each of the one or more orders for food delivery to a respective driver client of one or more driver clients;
periodically updating the district data to reflect one or more respective districts for which each of one or more neighboring virtual machines of the particular virtual machine is responsible;
periodically determining whether current load of the particular virtual machine has dropped below a lower bound value and in response to determining that the current load has dropped below the lower bound value initiating a termination action;
periodically determining whether the current load has risen above an upper bound value and in response to determining that the current load has risen above the upper bound value initiating a spawning action;
periodically balancing load with the one or more neighboring virtual machines by exchanging a set of districts with the one or more neighboring virtual machines;
wherein the one or more driver clients are each communicatively coupled to a respective non-transitory computer-readable storage medium storing one or more instructions which, when executed by a particular driver client of the one or more driver clients causes the particular driver client to perform:
receiving an assignment of an order sent by a virtual machine of the one or more virtual machines and, in response to receiving the assignment, displaying one or more details of the order within a user interface of the particular driver client.

13. A method comprising:
storing, by a particular node, district data identifying one or more districts of a geographical region for which the particular node is responsible for processing requests, wherein the particular node is a member of one or more nodes, wherein each node of the one or more nodes represents a computational resource;
receiving, by the particular node, one or more requests associated with the one or more districts for which the particular node is responsible and processing the one or more requests;
periodically updating, by the particular node, the district data to reflect one or more respective districts for which each of one or more neighboring nodes of the particular node is responsible;
periodically determining, by the particular node, whether current load of the particular node has dropped below a lower bound value and in response to determining that the current load has dropped below the lower bound value initiating a termination action;
periodically determining, by the particular node, whether the current load has risen above an upper bound value and in response to determining that the current load has risen above the upper bound value initiating a spawning action;
periodically balancing load, by the particular node, with the one or more neighboring nodes by exchanging a set of districts with the one or more neighboring nodes.

14. The method of claim 13, wherein periodically updating the district data includes:
sending one or more messages to the one or more neighboring nodes requesting districts for which the one or more neighboring nodes are responsible;
in response to receiving a response from a particular neighboring node of the one or more neighboring nodes that identifies districts for which the particular neighboring node is responsible, updating the district data based on the identified districts;
in response to failing to receive a response from the particular neighboring node for a length of time, assuming responsibility for one or more districts for which the particular neighboring node was formerly responsible and updating the district data to reflect that the particular node has assumed responsibility for the one or more districts for which the particular neighboring node was formerly responsible.

15. The method of claim 13, wherein the termination action includes:
waiting a period of time;
in response to determining that a message is received from a neighboring node that indicates an intention to terminate within the period of time, entering into conflict resolution with the neighboring node;
in response to determining that the current load has risen above the lower bound value within the period of time, aborting the termination action;
in response to determining that the period of time has passed, assigning the one or more districts for which the particular node is responsible to the one or more neighboring nodes and terminating.

16. The method of claim 15, wherein the conflict resolution involves selecting a random period of time to wait before restarting the termination action and in response to determining that the random period of time has passed restarting the termination action.

17. The method of claim 13, wherein the spawning action includes:
waiting a period of time;
in response to determining that a message is received from a neighboring node that indicates an intention to spawn within the period of time, entering into conflict resolution with the neighboring node;
in response to determining that the current load has fallen below the upper bound value within the period of time, aborting the spawning action;
in response to determining that the period of time has passed, spawning a new node and assigning a portion of the one or more districts for which the particular node is responsible to the new node.

18. The method of claim 17, wherein the conflict resolution involves selecting a random period of time to wait before restarting the spawning action and in response to determining that the random period of time has passed restarting the spawning action.

19. The method of claim 13, wherein balancing the load with the one or more neighboring nodes involves:
generating one or more district exchanges between the particular node and the one or more neighboring nodes, wherein each district exchange of the one or more district exchanges is generated based on a random transfer of one or more districts between the particular node and the one or more neighboring nodes;
evaluating fitness of each district exchange of the one or more district exchanges to determine a most fit district exchange;
executing the most fit district exchange.

20. The method of claim 19, wherein evaluating fitness is performed based on one or more of: contiguity of respective districts for which the particular node and the one or more neighboring nodes will be responsible after the district exchange is executed, difference in loads between the particular node and the one or more neighboring nodes after the district exchange is executed, border to area ratio of the respective districts for which the particular node and the one or more neighboring nodes will be responsible after the district exchange is executed, density on both sides of a border between the particular node and the one or more neighboring nodes after the district exchange is executed.

21. The method of claim 20, wherein the random transfer of the one or more districts between the particular node and the one or more neighboring nodes has a chance to swap responsibility of a district for which the particular node is responsible and a district for which a neighboring node of the particular node is responsible.

22. The method of claim 20, wherein executing the most fit district exchange involves sending a message to each particular neighbor of neighboring nodes which exchange one or more districts under the most fit district exchange, the message identifying the one or more districts that are to be exchanged between the particular neighbor and the particular node.

23. The method of claim 13, wherein each node of the one or more nodes represents a computer.

24. A method comprising:
   storing, by a particular diner client, district data identifying one or more districts of a geographical region for which the particular diner client is responsible for processing requests, wherein the particular diner client is a member of a plurality of diner clients;
   sending a message to an order receiving server that represents an order for food delivery;
   wherein the order receiving server is communicatively coupled to a non-transitory computer-readable storage medium storing one or more instructions which, when executed by the order receiving server, causes the order receiving to perform:
   receiving the message from the particular diner client, and
   storing an entry identifying the order for food delivery in an order database;
   one or more virtual machines executing within an order assignment server cluster, wherein each virtual machine of the one or more virtual machines has accessed to respective district data identifying one or more districts of a geographical region for which the virtual machine is responsible for processing requests, wherein the order assignment server cluster is communicatively coupled to one or more non-transitory computer-readable storage mediums that each store one or more instructions which, when executed by a particular virtual machine of the one or more virtual machines, causes the particular virtual machine to perform:
   retrieving one or more orders for food delivery from the order database based on a respective delivery address associated with each of the one or more orders and district data associated with the particular virtual machine and assigning each of the one or more orders for food delivery to a respective driver client of one or more driver clients;
   periodically updating the district data to reflect one or more respective districts for which each of one or more neighboring virtual machines of the particular virtual machine is responsible;
   periodically determining whether current load of the particular virtual machine has dropped below a lower bound value and in response to determining that the current load has dropped below the lower bound value initiating a termination action;
   periodically determining whether the current load has risen above an upper bound value and in response to determining that the current load has risen above the upper bound value initiating a spawning action;
   periodically balancing load with the one or more neighboring virtual machines by exchanging a set of districts with the one or more neighboring virtual machines;
   wherein the one or more driver clients are each communicatively coupled to a respective non-transitory computer-readable storage medium storing one or more instructions which, when executed by a particular driver client of the one or more driver clients causes the particular driver client to perform:
   receiving an assignment of an order sent by a virtual machine of the one or more virtual machines and, in response to receiving the assignment, displaying one or more details of the order within a user interface of the particular driver client.

* * * * *